(12) United States Patent
Zhang

(10) Patent No.: US 11,523,286 B2
(45) Date of Patent: Dec. 6, 2022

(54) METHOD AND DEVICE FOR WIRELESS COMMUNICATION IN UE AND BASE STATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 200 days.

(21) Appl. No.: 16/923,125

(22) Filed: Jul. 8, 2020

(65) Prior Publication Data

US 2020/0336917 A1    Oct. 22, 2020

Related U.S. Application Data

(63) Continuation of application No. PCT/CN2018/072306, filed on Jan. 12, 2018.

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/0446* (2013.01); *H04W 74/0808* (2013.01)

(58) Field of Classification Search
CPC ............. H04W 16/14; H04W 72/0446; H04W 74/0808; H04W 72/04; H04W 72/12;
(Continued)

(56) References Cited

U.S. PATENT DOCUMENTS

2016/0366689 A1    12/2016    Zhang et al.
2017/0280475 A1*    9/2017    Yerramalli ............ H04W 16/14
(Continued)

FOREIGN PATENT DOCUMENTS

| CN | 105611537 A | 5/2016 |
|----|-------------|--------|
| CN | 107079464 A | 8/2017 |
| CN | 107113046 Y | 8/2017 |

OTHER PUBLICATIONS

ISR received in application No. PCT/CN2018/072306 dated Jul. 31, 2018.
(Continued)

*Primary Examiner* — Siren Wei

(57) ABSTRACT

The present disclosure provides a method and a device in a User Equipment (UE) and a base station used for wireless communications. The UE receives first information and second information, performs a first access detection in a first time window, and then transmits a first radio signal at a first time, or drops transmission of a first radio signal at a first time; wherein the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window.

16 Claims, 18 Drawing Sheets

(51) Int. Cl.
*H04W 72/04* (2009.01)
*H04W 74/08* (2009.01)

(58) Field of Classification Search
CPC . H04W 74/0833; H04W 76/11; H04W 76/27; H04W 72/042; H04W 72/0453; H04W 74/02
See application file for complete search history.

(56) References Cited

U.S. PATENT DOCUMENTS

2017/0353972 A1* 12/2017 Babaei ................ H04W 72/02
2019/0014596 A1* 1/2019 Yang .................... H04W 74/08
2020/0204316 A1* 6/2020 Zhang ................... H04B 1/713

OTHER PUBLICATIONS

Ericsson. "On Remaining Details of DLLAA LBTProcedures and Parameters" 3GPPTSGRAN WGIMeeting83 R1-157257,Nov. 20, 2015(Nov. 20, 2015).
CN201880083336.5 First Office Action dated Jun. 6, 2022.
CN201880083336.5 First Search Report dated May 30, 2022.
Huawei,HiSilicon "UEdemodulationperformancerequirementsforLAA" 3GPP TSG-RAN WG4 Meeting#78 R4-160742, Feb. 8, 2016.
China Mobile Com.Corporation "Mapping of QCI to LBT priorityclass" 3GPP TSG-RAN WG2 Meeting#92 R2-156248, Nov. 6, 2015.
WI rapporteur(Ericsson,Huawei) 3GPP TSG RAN WG1 Meeting#82bis R1-156379 Nov. 3, 2015.

* cited by examiner

Transmitting beam of given antenna port

Receiving beam of given energy detection

Transmitting beam of given antenna port

Receiving beam of given energy detection

Condition:
1. First antenna port group is spatially correlated with second antenna port group
2. First priority class is greater than second priority class Condition:
1. First antenna port group is spatially correlated with second antenna port group
2. First priority class is greater than second priority class ☐ P energy detection(s)

☐ First access detection

Condition:
1. First antenna port group is not spatially correlated with second antenna port group ☐ P energy detection(s)

☐ First access detection

Condition:
1. First antenna port group is not spatially correlated with second antenna port group

METHOD AND DEVICE FOR WIRELESS COMMUNICATION IN UE AND BASE STATION

CROSS REFERENCE TO RELATED APPLICATIONS

This application is a continuation of International Application No. PCT/CN2018/072306, filed Jan. 12, 2018, claims the priority benefit of International Patent Application No. PCT/CN2018/072306, filed on Jan. 12, 2018, the full disclosure of which is incorporated herein by reference.

BACKGROUND

Technical Field

The present disclosure relates to transmission methods and devices in wireless communication systems, and in particular to a communication method and device that support data transmissions on Unlicensed Spectrum.

Related Art

In traditional 3rd Generation Partner Project (3GPP) Long-term Evolution (LTE) systems, data transmissions can only be performed on licensed spectrum, however, as traffic enlarges rapidly, especially in some cities and regions, licensed spectrum may hardly meet the requirements of increasing traffic. Therefore, communications on unlicensed spectrum in Release 13 and Release 14 is introduced into cellular systems and used for downlink and uplink data transmissions. In order to guarantee the compatibility with other access technologies on unlicensed spectrum, Listen Before Talk (LBT) is adopted by Licensed Assisted Access (LAA) to avoid interference incurred by multiple transmitters occupying same frequency resources simultaneously. The transmitter of the LTE system adopts a quasi-omnidirectional antenna to perform LBT.

In a fourth-category LBT (Cat 4 LBT, which can be found in 3GPP TR 36. 889) process of the LTE, a transmitter (a base station or a UE) further performs a backoff after a certain Defer duration, a time for the backoff is counted based on a measurement unit of Clear Channel Assessment (CCA) slot duration, a number of slot durations within the backoff is randomly chosen by the transmitter within Contention Window Size (CWS). The CWS is determined by a Channel Access Priority Class, the smaller the Channel Access Priority Class is, the smaller the CWS. The specific meaning of the Channel Access Priority Class can be found in 3GPP TS36.213, chapter 15.

Currently, discussion on 5G New Radio Access Technology (NR) is in progress, among which Massive Multi-Input Multi-Output (MIMO) becomes a hot topic when studying next generation mobile communications. For the massive MIMO, multiple antennas based on beamforming form a narrow beam which points to a particular direction to improve communication quality. When considering coverage characteristics brought by beamforming, the conventional LAA technology needs to be reconsidered, such as the LBT scheme.

SUMMARY

The inventor has found through researches that in NR system, beamforming will be used on a large scale. A key issue needs to be solved is that how to increase the system capacity in case of ensuring that same frequency interference among multiple transmitters is avoided.

In view of the above problem, the present disclosure provides a solution. It should be noted that, in the case of no conflict, the embodiments of the present disclosure and the features in the embodiments may be combined with each other arbitrarily.

The present disclosure discloses a method in a User Equipment (UE) for wireless communications, comprising:
receiving first information and second information;
performing a first access detection in a first time window;
transmitting a first radio signal at a first time, or dropping transmission of a first radio signal at a first time;
wherein the first access detection is used for determining whether the first radio signal is transmitted at the first time; the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, a problem needed to be solved in the present disclosure is: In NR system, due to a radio signal is transmitted with the adoption of massive MIMO technology, interference conditions in different beam directions will be very different, and LBT based on beamforming can more truly reflect an interference condition in a specific beam direction. If a base station dispatches a UE to perform transmissions of multiple uplink radio signals, the multiple uplink radio signals may all need to perform LBT based on beamforming before transmissions, and some of the multiple LBTs may be spatially correlated with each other. So how the UE manages the multiple LBTs is a problem to be solved.

In one embodiment, the above method is essential in that the base station dispatches the UE to perform transmissions of a first radio signal and a second radio signal, a first radio signal corresponding to a first LBT, a second radio signal corresponding to a second LBT, and a first radio signal can be transmitted after a first access detection determines that a channel is idle. Duration of a first access detection, that is, duration of a first time window, is related to a spatial relationship between a first LBT and a second LBT, a first LBT priority class and a second LBT priority class. When the first LBT and the second LBT are spatially correlated, duration of a first time window is only related to a greater one between the first LBT priority class and the second LBT priority class; when the first LBT and the second LBT are not spatially correlated, duration of a first time window is only related to the first LBT priority class; the above method is advantageous in that if multiple LBTs are spatially correlated with each other, they can share a same channel monitoring process, so as to avoid a possibility of repeated monitoring incurred by independent LBTs, thus reducing channel monitoring time, shortening access time and increasing access chance.

In one embodiment, the above method is essential in that the base station dispatches the UE to perform transmissions of a first radio signal and a second radio signal, the first radio signal corresponding to a first LBT, the second radio signal corresponding to a second LBT, and the first radio signal can be transmitted after a first access detection determines that a channel is idle. A second LBT starts before a first LBT, the second LBT being in progress before the first LBT starts, and whether the second LBT is interrupted is related to a spatial relationship between the first LBT and the second LBT. If a beam direction of the second LBT and a beam direction of the first LBT are spatially correlated, a priority class relationship between the two LBTs determines whether to interrupt the second LBT; when a priority class of the second LBT is not less than that of the first LBT, the second LBT is continued until the end, a first access detection being the second LBT, otherwise, the second LBT is interrupted and the first LBT is started, a first access detection being the first LBT. If a beam direction of the second LBT and a beam direction of the first LBT are not spatially correlated, the first LBT is started, a first access detection being the first LBT. The above method is advantageous in that if multiple LBTs are spatially correlated with each other and a priority class of an earlier-started LBT is not less than that of a latter LBT, then the latter LBT is unnecessary, and the earlier-started LBT is used for determining whether radio signals corresponding to the multiple LBTs can be transmitted, thus avoiding repeated monitoring of channel, shortening access time and increasing access chance.

According to one aspect of the present disclosure, the above method is characterized in that the first access detection comprises:

performing G energy detection(s) respectively in G time sub-pool(s) on a first sub-band to obtain G detection value(s), G being a positive integer;

wherein the first time window comprises the G time sub-pool(s), and whether the first antenna port group is spatially correlated with the second antenna port group is used for determining the G.

According to one aspect of the present disclosure, the above method is characterized in comprising:

performing P energy detection(s) respectively in P time sub-pool(s) on the first sub-band to obtain P detection value(s), P being a positive integer;

wherein the second priority class is used for determining the P, the P energy detection(s) is(are) correlated with the second antenna port group; a start time of the P time sub-pool(s) is earlier than a start time of the first time window; the first antenna port group is spatially correlated with the second antenna port group, and the first priority class is greater than the second priority class; or the first antenna port group is not spatially correlated with the second antenna port group.

According to one aspect of the present disclosure, the above method is characterized in that the first antenna port group is spatially correlated with the second antenna port group; the first priority class is not greater than the second priority class, the second priority class being used for determining the G, and the G energy detection(s) is(are) correlated with the second antenna port group.

According to one aspect of the present disclosure, the above method is characterized in that the first antenna port group is spatially correlated with the second antenna port group; the first priority class is greater than the second priority class, the first priority class being used for determining the G, and the G energy detection(s) is(are) correlated with the first antenna port group.

According to one aspect of the present disclosure, the above method is characterized in that the first antenna port group is not spatially correlated with the second antenna port group; the first priority class is used for determining the G, and the G energy detection(s) is(are) correlated with the first antenna port group.

According to one aspect of the present disclosure, the above method is characterized in comprising:

transmitting a second radio signal at a second time, or dropping transmission of a second radio signal at a second time;

wherein the second information indicates configuration information of the second radio signal, the second radio signal is correlated with the second antenna port group, and whether to transmit the second radio signal at the second time is related to whether the first antenna port group is spatially correlated with the second antenna port group.

The present disclosure discloses a method in a base station for wireless communications, comprising:

transmitting first information and second information;
monitoring a first radio signal at a first time;
wherein a first access detection performed in a first time window is used for determining whether to transmit the first radio signal at the first time; the first information indicates configuration information of the first radio signal and a first priority class, and the second information indicates a second priority class; the first radio signal is correlated with a first antenna port group, the first antenna port group being spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

According to one aspect of the present disclosure, the above method is characterized in that the first access detection comprises:

performing G energy detection(s) respectively in G time sub-pool(s) on a first sub-band to obtain G detection value(s), G being a positive integer;

wherein the first time window comprises the G time sub-pool(s), and whether the first antenna port group is spatially correlated with the second antenna port group is used for determining the G.

According to one aspect of the present disclosure, the above method is characterized in that a receiver of the second information performs P energy detection(s) respectively in P time sub-pool(s) on the first sub-band to obtain P detection value(s), P being a positive integer;

wherein the second priority class is used for determining the P, the P energy detection(s) is(are) correlated with the second antenna port group; a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

According to one aspect of the present disclosure, the above method is characterized in that the first antenna port group is spatially correlated with the second antenna port group, the first priority class is not greater than the second priority class, the second priority class is used for determining the G, and the G energy detection(s) is(are) correlated with the second antenna port group.

According to one aspect of the present disclosure, the above method is characterized in that the first antenna port group is spatially correlated with the second antenna port group; the first priority class is greater than the second priority class, the first priority class being used for determining the G, and the G energy detection(s) is(are) correlated with the first antenna port group.

According to one aspect of the present disclosure, the above method is characterized in that the first antenna port group is not spatially correlated with the second antenna port group, the first priority class is used for determining the G, and the G energy detection(s) is(are) correlated with the first antenna port group.

According to one aspect of the present disclosure, the above method is characterized in comprising:

monitoring a second radio signal at a second time;

wherein the second information indicates configuration information of the second radio signal, the second radio signal being correlated with the second antenna port group; whether the second radio signal is transmitted at the second time is related to whether the first antenna port group is spatially correlated with the second antenna port group.

The present disclosure discloses a UE used for wireless communications, comprising:

a first receiver, receiving first information and second information, and performing a first access detection in a first time window;

a first transmitter, transmitting a first radio signal at a first time, or dropping transmission of a first radio signal at a first time;

wherein the first access detection is used for determining whether the first radio signal is transmitted at the first time; the first information indicates configuration information of the first radio signal and a first priority class, and the second information indicates a second priority class; the first radio signal is correlated with a first antenna port group, the first antenna port group being spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, the above UE is characterized in that the first access detection comprises:

performing G energy detection(s) respectively in G time sub-pool(s) on a first sub-band to obtain G detection value(s), G being a positive integer;

wherein the first time window comprises the G time sub-pool(s), and whether the first antenna port group is spatially correlated with the second antenna port group is used for determining the G.

In one embodiment, the above UE is characterized in that the first receiver also performs P energy detection(s) respectively in P time sub-pool(s) on the first sub-band to obtain P detection value(s), P being a positive integer;

wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

In one embodiment, the above UE is characterized in that the first antenna port group is spatially correlated with the second antenna port group; the first priority class is not greater than the second priority class, and the second priority class is used for determining the G; the G energy detection(s) is(are) correlated with the second antenna port group.

In one embodiment, the above UE is characterized in that the first antenna port group is spatially correlated with the second antenna port group; the first priority class is greater than the second priority class, the first priority class being used for determining the G, and the G energy detection(s) is(are) correlated with the first antenna port group.

In one embodiment, the above UE is characterized in that the first antenna port group is not spatially correlated with the second antenna port group; the first priority class is used for determining the G, and the G energy detection(s) is(are) correlated with the first antenna port group.

In one embodiment, the above UE is characterized in that the first transmitter also transmits a second radio signal at a second time, or dropping transmission of a second radio signal at a second time;

wherein the second information indicates configuration information of the second radio signal, the second radio signal is correlated with the second antenna port group, and whether the second radio signal is transmitted at the second time is related to whether the first antenna port group is spatially correlated with the second antenna port group.

The present disclosure discloses a base station used for wireless communications, comprising:

a second transmitter, transmitting first information and second information;

a second receiver, monitoring a first radio signal at a first time;

wherein a first access detection performed in a first time window is used for determining whether the first radio signal is transmitted at the first time; the first information indicates configuration information of the first radio signal and a first priority class, and the second information indicates a second priority class; the first radio signal is correlated with a first antenna port group, which is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, the above base station is characterized in that the first access detection comprises:

performing G energy detection(s) respectively in G time sub-pool(s) on a first sub-band to obtain G detection value(s), G being a positive integer;

wherein the first time window comprises the G time sub-pool(s), and whether the first antenna port group is spatially correlated with the second antenna port group is used for determining the G.

In one embodiment, the above base station is characterized in that a receiver of the second information performs P energy detection(s) respectively in P time sub-pool(s) on the first sub-band to obtain P detection value(s), P being a positive integer;

wherein the second priority class is used for determining the P, and the P energy detection(s) is(are) correlated with the second antenna port group; a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

In one embodiment, the above base station is characterized in that the first antenna port group is spatially correlated with the second antenna port group; the first priority class is not greater than the second priority class, and the second priority class is used for determining the G; the G energy detection(s) is(are) correlated with the second antenna port group.

In one embodiment, the above base station is characterized in that the first antenna port group is spatially correlated with the second antenna port group; the first priority class is greater than the second priority class, the first priority class being used for determining the G; the G energy detection(s) is(are) correlated with the first antenna port group.

In one embodiment, the above base station is characterized in that the first antenna port group is not spatially correlated with the second antenna port group, the first priority class is used for determining the G, and the G energy detection(s) is(are) correlated with the first antenna port group.

In one embodiment, the above base station is characterized in that the second receiver also monitors a second radio signal at a second time;

wherein the second information indicates configuration information of the second radio signal, the second radio signal being correlated with the second antenna port group; whether the second radio signal is transmitted at the second time is related to whether the first antenna port group is spatially correlated with the second antenna port group.

In one embodiment, the present disclosure has the following advantages over conventional schemes:

For multiple LBTs, whether they are spatially correlated with each other and their priorities are considered to ensure that spatially-correlated LBTs may share a same channel monitoring process, thus avoiding repeated monitoring incurred by independent LBTs, reducing channel monitoring time, shortening access time, and increasing access chance.

If multiple LBTs are spatially correlated with each other and a priority class of an earlier-started LBT is not less than that of a latter LBT, then the latter LBT is unnecessary, and the earlier-started LBT can be used for determining whether radio signals corresponding to the multiple LBTs can be transmitted, thus avoiding repeated monitoring of the channel, and shortening access time.

If multiple LBTs are not spatially correlated with each other, when there is an time-domain overlap among them, and if receiving beams of the multiple LBTs are respectively formed by different antennas, the multiple LBTs can be performed simultaneously; otherwise, a LBT in progress among the multiple LBTs may need to be interrupted, and another LBT among the multiple LBTs is started.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
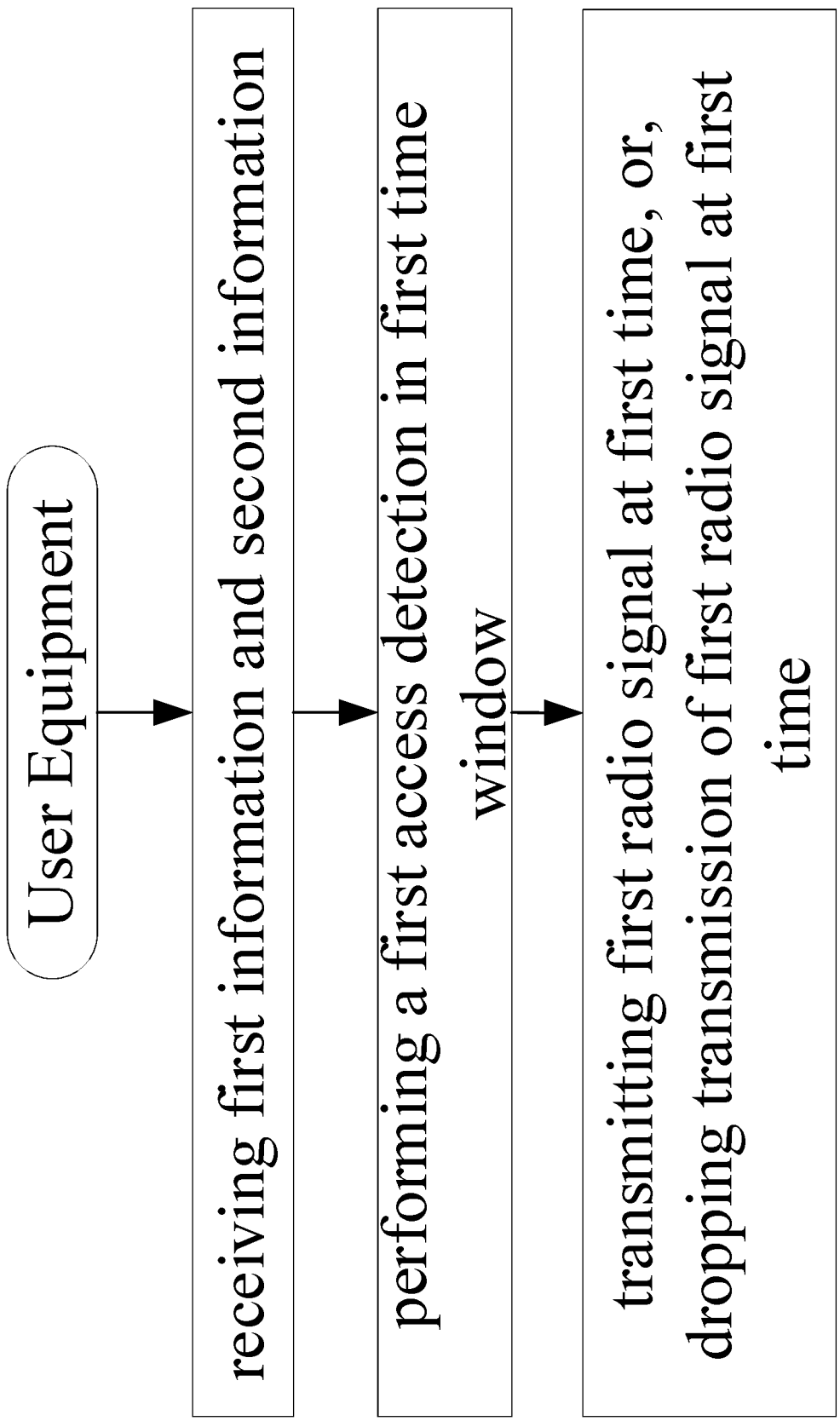
FIG. 1 illustrates a flowchart of first information, second information, a first access detection and a first radio signal according to one embodiment of the present disclosure.

Embodiment 1 illustrates a flowchart of first information, second information, a first access detection and a first radio signal, as shown in FIG. 1.

In Embodiment 1, the UE in the present disclosure receives first information and second information; performs a first access detection in a first time window; transmits a first radio signal at a first time, or drops the transmission of a first radio signal at a first time; wherein the first access detection is used for determining whether the first radio signal is transmitted at the first time; the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, a start time for a transmission of the first radio signal is after an end time of the first access detection.

In one embodiment, the phrase that a given radio signal is correlated with a given antenna port group refers to: a transmission antenna port group of the given antenna signal is the given antenna port group.

In one embodiment, the phrase that a given radio signal is correlated with a given antenna port group refers to: a transmission antenna port group of the given radio signal is correlated with the given antenna port group.

In one embodiment, the first information is dynamically configured.

In one embodiment, the first information is carried by a physical layer signaling.

In one embodiment, the first information belongs to Downlink Control Information (DCI).

In one embodiment, the first information is DCI with DownLink Grant.

In one embodiment, the first information is DCI with UpLink Grant.

In one embodiment, the first information is a Field of DCI, the Field comprising a positive integer number of bit(s).

In one embodiment, the first information consists of multiple Fields of DCI, the Field comprising a positive integer number of bit(s).

In one embodiment, the first information is transmitted on the first sub-band.

In one embodiment, the first information is transmitted on a frequency-band other than the first sub-band.

In one embodiment, the first information is transmitted on a frequency-band deployed on licensed spectrum other than the first sub-band.

In one embodiment, the first information is transmitted on a frequency-band deployed on unlicensed spectrum other than the first sub-band.

In one embodiment, the first information is transmitted on a frequency-band deployed on licensed spectrum.

In one embodiment, a transmission channel corresponding to the first information is a Downlink Shared Channel (DL-SCH).

In one embodiment, the first information is transmitted on a downlink physical layer control channel (i.e., a downlink channel that can only be used for bearing a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first information is transmitted on a downlink physical data channel (i.e., a downlink channel that can be used for bearing physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the first information explicitly indicates configuration information of the first radio signal.

In one embodiment, the first information explicitly indicates a first priority class.

In one embodiment, the first information implicitly indicates configuration information of the first radio signal.

In one embodiment, the first information implicitly indicates a first priority class.

In one embodiment, configuration information of the first radio signal comprises the first antenna port group.

In one embodiment, configuration information of the first radio signal comprises indexes of all antenna ports in the first antenna port group.

In one embodiment, configuration information of the first radio signal comprises an index of the first antenna port group in a given antenna port group set, the given antenna port group set comprises one or more antenna port groups, and the antenna port group comprises one or more antenna ports.

In one subembodiment of the above embodiment, configuration of the given antenna port group set is carried by a higher-layer signaling.

In one subembodiment of the above embodiment, configuration of the given antenna port group set is carried by a Radio Resource Control (RRC) signaling.

In one subembodiment of the above embodiment, configuration of the given antenna port group set is all or part of an Information Element (IE) of an RRC signaling.

In one subembodiment of the above embodiment, configuration of the given antenna port group set is carried by a Medium Access Control (MAC) Control Element (CE).

In one subembodiment of the above embodiment, configuration of the given antenna port group set is transmitted in a System Information Block (SIB).

In one embodiment, configuration information of the first radio signal explicitly indicates the first antenna port group.

In one embodiment, configuration information of the first radio signal implicitly indicates the first antenna port group.

In one embodiment, the second information indicates a second priority class and a second antenna port group.

In one embodiment, the second information explicitly indicates a second priority class and a second antenna port group.

In one embodiment, the second information implicitly indicates a second priority class and a second antenna port group.

In one embodiment, the second information explicitly indicates a second priority class, the second information further implicitly indicates a second antenna port group.

In one embodiment, the second information implicitly indicates a second priority class, and the second information also explicitly indicates a second antenna port group.

In one embodiment, the second information indicates a second priority class and a third antenna port group, the third antenna port group being correlated with a second antenna port group.

In one subembodiment of the above embodiment, the third antenna port group is a transmission antenna port of the second radio signal.

In one embodiment, the second information explicitly indicates a second priority class and a third antenna port group, the third antenna port group being correlated with a second antenna port group.

In one subembodiment of the above embodiment, the third antenna port group is a transmission antenna port group of the second radio signal.

In one embodiment, the second information implicitly indicates a second priority class and a third antenna port group, the third antenna port group being correlated with a second antenna port group.

In one subembodiment of the above embodiment, the third antenna port group is a transmission antenna port of the second radio signal.

In one embodiment, the second information explicitly indicates a second priority class, and the second information also implicitly indicates a third antenna port group, the third antenna port group being correlated with a second antenna port group.

In one subembodiment of the above embodiment, the third antenna port group is a transmission antenna port of the second radio signal.

In one embodiment, the second information implicitly indicates a second priority class, and the second information also explicitly indicates a third antenna port group, the third antenna port group being correlated with a second antenna port group.

In one subembodiment of the above embodiment, the third antenna port group is a transmission antenna port of the second radio signal.

In one embodiment, the second information explicitly indicates a second priority class.

In one embodiment, the second information implicitly indicates a second priority class.

In one embodiment, the second information explicitly indicates a second antenna port group.

In one embodiment, the second information implicitly indicates a second antenna port group.

In one embodiment, the second information implicitly indicates a third antenna port group, the third antenna port group being correlated with a second antenna port group.

In one subembodiment of the above embodiment, the third antenna port group is a transmission antenna port group of the second radio signal.

In one embodiment, the second information is dynamically configured.

In one embodiment, the second information is carried by a physical layer signaling.

In one embodiment, the second information belongs to Downlink Control Information (DCI).

In one embodiment, the second information belongs to DCI with DownLink Grant.

In one embodiment, the second information belongs to DCI with Uplink Grant.

In one embodiment, the second information is a Field of DCI, the Field comprising a positive integer number of bit(s).

In one embodiment, the second information consists of multiple Fields of DCI, the Field comprises a positive integer number of bit(s).

In one embodiment, the second information is transmitted on the first sub-band.

In one embodiment, the second information is transmitted on a frequency-band other than the first sub-band.

In one embodiment, the second information is transmitted on a frequency-band deployed on licensed spectrum other than the first sub-band.

In one embodiment, the second information is transmitted on a frequency-band deployed on unlicensed spectrum other than the first sub-band.

In one embodiment, the second information is transmitted on a frequency-band deployed on licensed spectrum.

In one embodiment, a transmission channel corresponding to the first information is a DL-SCH.

In one embodiment, the second information is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the second information is transmitted on a downlink physical layer data channel (i.e., a downlink channel that can be used for bearing physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the first information and the second information are transmitted in a same slot.

In one embodiment, the first information and the second information are transmitted in a same subframe.

In one embodiment, the first information and the second information are transmitted in different slots.

In one embodiment, the first information and the second information are transmitted in different subframes.

In one embodiment, a time for transmission of the second information in time domain is located before a time for transmission of the first information.

In one embodiment, a slot transmitting the second information in time domain is located before a slot transmitting the first information.

In one embodiment, a subframe transmitting the second information in time domain is located before a subframe transmitting the first information.

In one embodiment, the first information and the second information belong to different DCI.

In one embodiment, the first information and the second information belong to same DCI.

In one embodiment, the first information and the second information are respectively a first field and a second field in DCI.

In one embodiment, the first information and the second information are respectively a first field set and a second field set in DCI, the first field set consisting of one or more fields, the second field set consisting of one or more fields, and any field in the first field set does not belong to the second field set.

In one embodiment, the first radio signal comprises at least one of data, control information or a reference signal.

In one embodiment, the first radio signal comprises data.

In one embodiment, the first radio signal comprises control information.

In one embodiment, the first radio signal comprises a reference signal.

In one embodiment, the first radio signal comprises data, control information and a reference signal.

In one embodiment, the first radio signal comprises data and control information.

In one embodiment, the first radio signal comprises control information and a reference signal.

In one embodiment, the first radio signal comprises data and a reference signal.

In one embodiment, the first radio signal is transmitted on the first sub-band.

In one embodiment, the configuration information of the first radio signal includes at least one of a Modulation and Coding Scheme (MC S), configuration information of DeModulation Reference Signals (DMRS), a Hybrid Automatic Repeat reQuest (HARD) process number, a Redundancy Version (RV), a New Data Indicator (NDI), power control, Channel State Information (CSI) request, time-frequency resources occupied, the corresponding multi-antenna relevant transmission or the corresponding multi-antenna relevant reception.

In one subembodiment of the above embodiment, configuration information of the DMRS includes one or more of time-domain resources occupied, frequency-domain resources occupied, code-domain resources occupied, a cyclic shift or an OCC.

In one subembodiment of the above embodiment, the first radio signal comprises control information.

In one subembodiment of the above embodiment, the first radio signal comprises data.

In one subembodiment of the above embodiment, the first radio signal comprises data and control information.

In one subembodiment of the above embodiment, the first radio signal comprises data and DMRS.

In one subembodiment of the above embodiment, the first radio signal comprises data, DMRS and control information.

In one embodiment, the configuration information of the first radio signal includes at least one of time-domain resources occupied, frequency-domain resources occupied, code-domain resources occupied, cyclic shift, an Orthogonal Cover Code (OCC), an antenna port occupied, the corresponding multi-antenna relevant transmission or the corresponding multi-antenna relevant reception.

In one subembodiment of the above embodiment, the first radio signal comprises a reference signal.

In one embodiment, the data is uplink data, the control information is Uplink control information (UCI), the reference signal comprises one or more of DMRS, a Sounding Reference Signal (SRS) and Phase error Tracking Reference Signals (PTRS).

In one embodiment, the control information comprises at least one of HARQ feedback or CSI.

In one embodiment, the CSI comprises at least one of a Rank indication (RI), a Precoding matrix indicator (PMI), a Channel quality indicator (CQI) or a Csi-reference signal Resource Indicator (CRI).

In one embodiment, a transmission channel corresponding to the first radio signal is an Uplink Shared Channel (UL-SCH).

In one embodiment, the first radio signal is transmitted on an uplink physical layer data channel (i.e., an uplink channel can be used for carrying physical layer data).

In one subembodiment of the above embodiment, the uplink physical layer data channel is a Physical Uplink Shared CHannel (PUSCH).

In one subembodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, the first radio signal is transmitted on an uplink physical layer control channel (that is, an uplink channel only capable of bearing a physical layer signaling).

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, the first radio signal is transmitted on the first sub-band.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving beamforming vector.

In one embodiment, the multi-antenna relevant reception refers to a receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting beamforming vector.

In one embodiment, the multi-antenna relevant transmission refers to a transmitting spatial filtering.

In one embodiment, the first priority class and the second priority class are both Channel Access Priority Classes.

In one embodiment, the specific meaning of the Channel Access Priority Class can be found in 3GPP TS 36.213, chapter 15.

In one embodiment, the smaller the Channel Access Priority Class is, the smaller the corresponding contention window (CW), the CW being the size of a contention window.

In one embodiment, the greater the Channel Access Priority Class is, the greater the corresponding contention window (CW), the CW being the size of a contention window.

In one embodiment, the specific meaning of the CW can be found in 3GPP TS36.213, chapter 15.

In one embodiment, the first access detection is used for determining whether the first sub-band is idle.

In one embodiment, the first access detection is used for determining whether the first sub-band can be used by the UE for transmitting the first radio signal.

Embodiment 2

Figure 2:
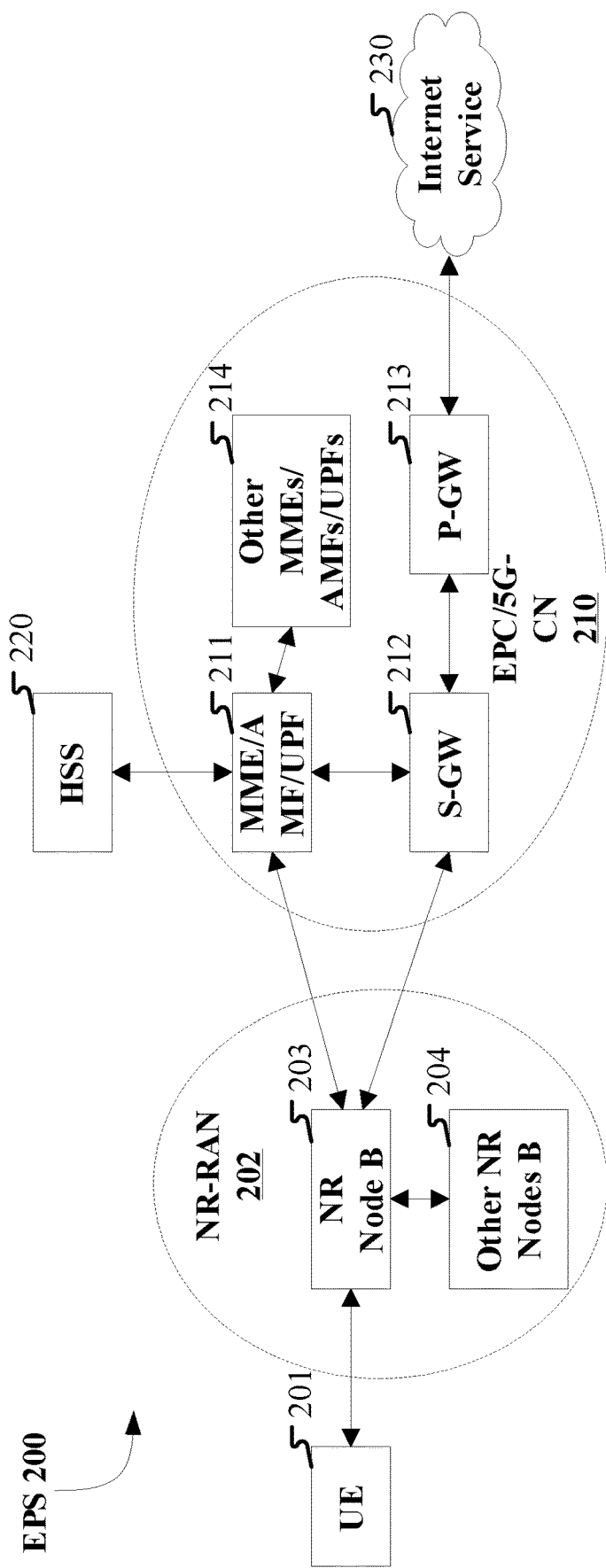
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 illustrates the network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the UE 201 corresponds to the first node in the present disclosure, the first node being a UE.

In one embodiment, the gNB 203 corresponds to the first node in the present disclosure, the first node being a base station.

In one subembodiment, the UE 201 supports wireless communications for data transmission on unlicensed spectrum.

In one subembodiment, the gNB 203 supports wireless communications for data transmission on unlicensed spectrum.

In one subembodiment, the UE 201 supports massive MIMO wireless communications.

In one subembodiment, the gNB 203 supports massive MIMO wireless communications.

Embodiment 3

Figure 3:
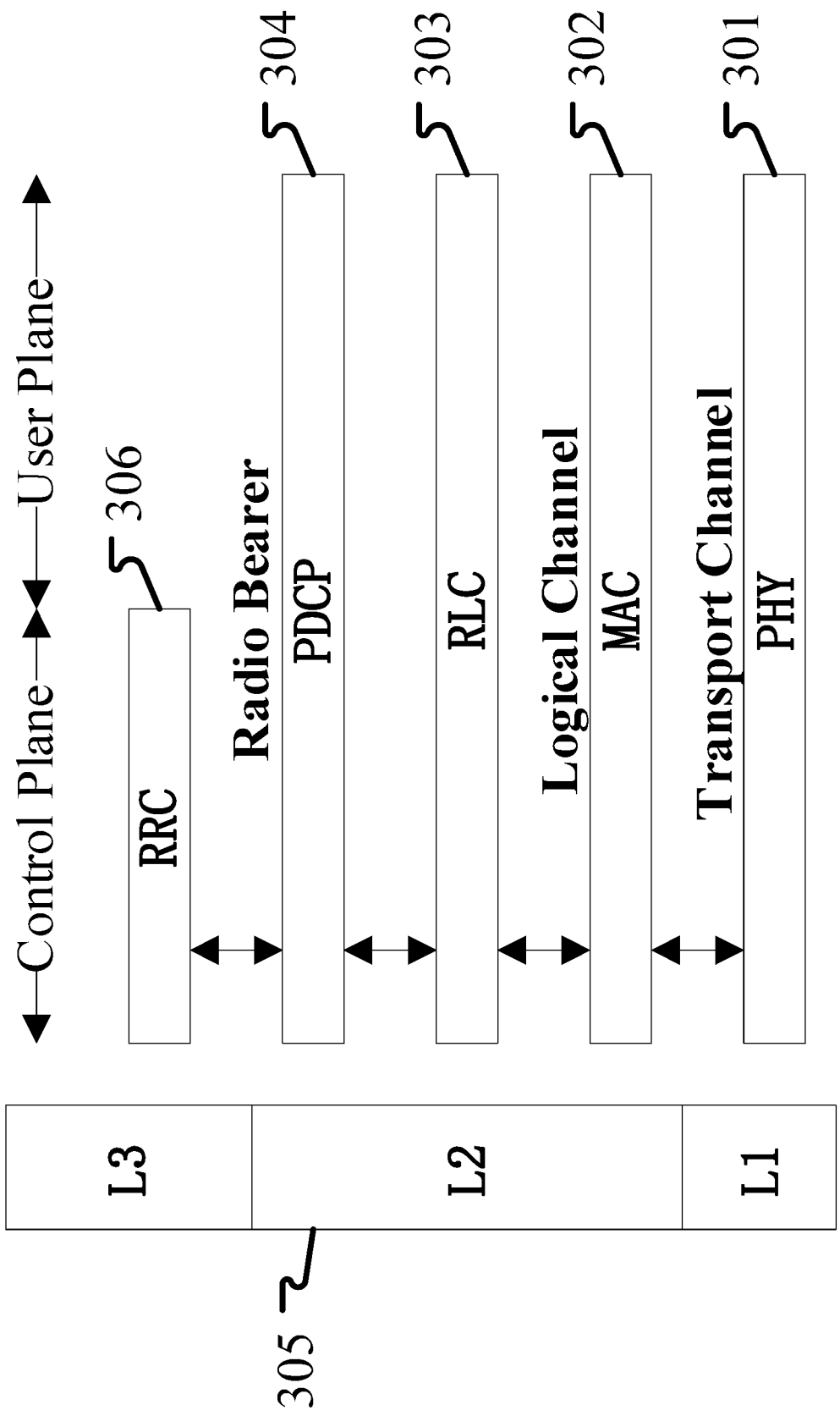
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the PHY 301.

In one embodiment, the second information in the present disclosure is generated by the PHY 301.

In one embodiment, the first access detection in the present disclosure is generated by the PHY 301.

In one embodiment, the first radio signal in the present disclosure is generated by the PHY 301.

In one embodiment, the G energy detection(s) in the present disclosure is(are) generated by the PHY 301.

In one embodiment, the P energy detection(s) in the present disclosure is(are) generated by the PHY 301.

In one embodiment, the second radio signal in the present disclosure is generated by the PHY 301.

Embodiment 4

Figure 4:
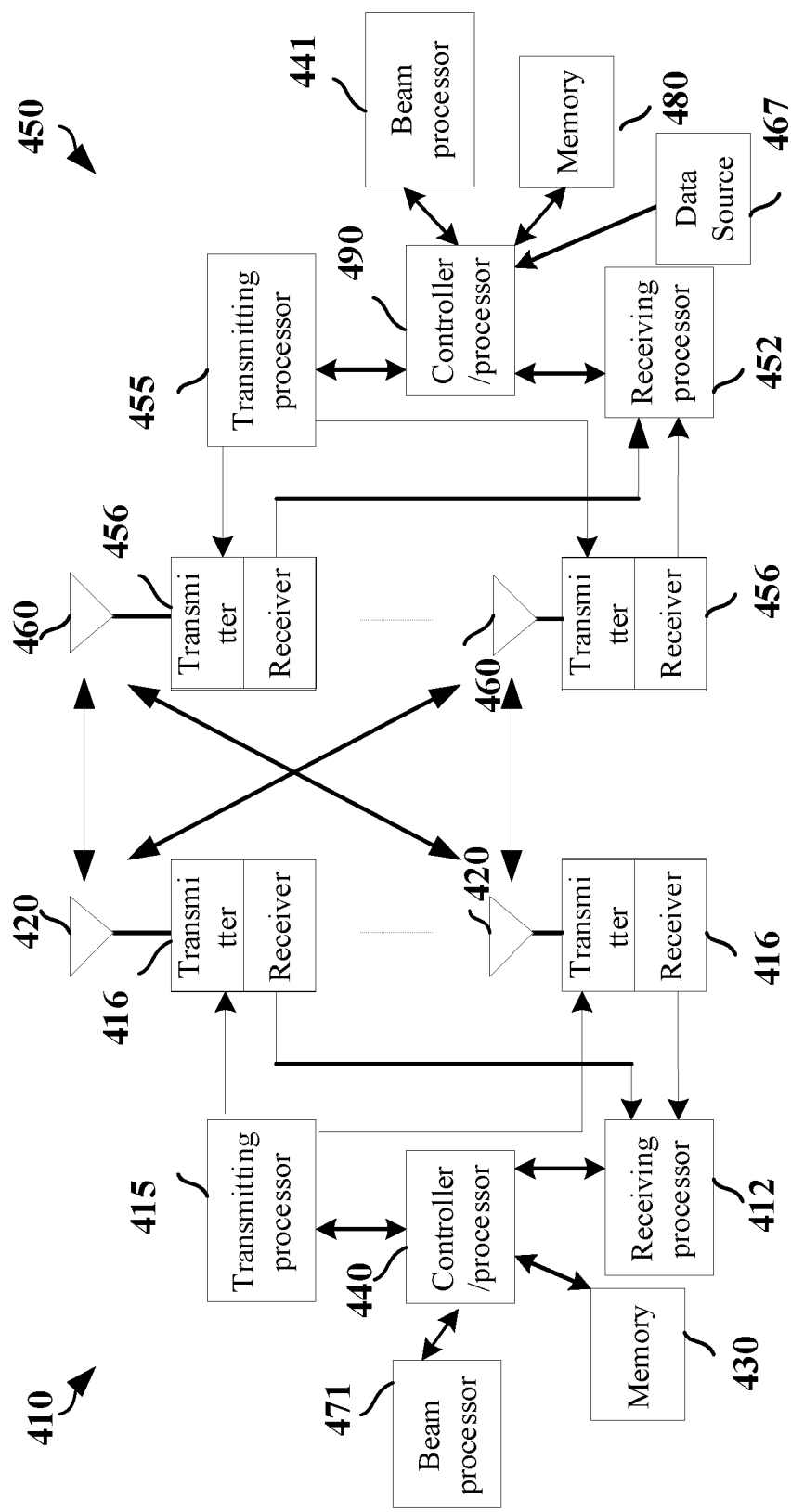
FIG. 4 illustrates a schematic diagram of a New Radio (NR) node and a UE according to one embodiment of the present disclosure.

Embodiment 4 illustrates a schematic diagram of an NR node and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a transmitting processor 415, a transmitter/receiver 416 and an antenna 420.

The UE (450) comprises a controller/processor 490, a memory 480, a data source 467, a transmitting processor 455, a receiving processor 452, a transmitter/receiver 456 and an antenna 460.

In downlink (DL) transmission, processes relevant to the base station (410) include the following:

a higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; the upper-layer packet may include data or control information, such as a Downlink Shared Channel (DL-SCH);

the controller/processor 440 is connected to the memory 430 that stores program codes and data. The memory 430 may be a computer readable medium;

the controller/processor 440 includes a scheduling unit for a transmission requirement, the scheduling unit being configured to schedule air interface resources corresponding to the transmission requirement;

the beam processor 471 determines first information and second information;

the transmitting processor 415 receives a bit stream output from the controller/processor 440, and performs signal transmitting processing functions of an L1 layer (that is, PHY), including encoding, interleaving, scrambling, modulation, power control/allocation and generation of physical layer control signaling (including PBCH, PDCCH, PHICH, PCFICH, reference signal), etc.;

the transmitter 416 is configured to convert the baseband signal provided by the transmitting processor 415 into a radio-frequency signal and transmit the radio-frequency signal via the antenna 420; each transmitter 416 performs sampling processing on respective input symbol streams to obtain respective sampled signal streams; each transmitter 416 performs further processing (for example, digital-to-analog conversion, amplification, filtering, upconversion, etc.) on respective sampled streams to obtain a downlink signal.

In DL transmission, processes relevant to the UE (450) include the following:

the receiver 456 is configured to convert a radio-frequency signal received via the antenna 460 into a baseband signal and provide the baseband signal to the receiving processor 452;

the receiving processor 452 performs various signal receiving processing functions used for L1 layer (that is, PHY), including decoding, de-interleaving, descrambling, demodulation and extraction of physical layer control signaling;

the beam processor 441 determines first information and second information;

the controller/processor 490 receives a bit stream output from the receiving processor 452, provides header decompression, decryption, packet segmentation and reordering as well as multiplexing and de-multiplexing between a logical channel and a transport channel so as to implement the L2 layer protocols for the user plane and the control plane;

the controller/processor 490 is connected to the memory 480 that stores program codes and data. The memory 480 may be called a computer readable medium.

In uplink (UL) transmission, processes relevant to the base station (410) include the following:

the receiver 416 receives a radio-frequency signal via a corresponding antenna 420, converts the received radio-frequency signal into a baseband signal, and provides the baseband signal to the receiving processor 412;

the receiving processor 412 performs various signal receiving processing functions used for L1 layer (i.e., PHY), including decoding, deinterleaving, descrambling, demodulation and extraction of physical layer control signaling;

the controller/processor 440 implements functions of the L2 layer, and is connected to the memory 430 that stores program codes and data;

the controller/processor 440 provides demultiplexing between a transport channel and a logical channel, packet reassembling, decryption, header decompression, and control signal processing to recover a higher-layer packet coming from the UE 450; a higher-layer packet from the controller/processor 440 can be provided to the core network;

the beam processor 471 determines a first radio signal;

in UL transmission, processes relevant to the UE (450) include the following:

the data source 467 provides a higher-layer packet to the controller/processor 490. The data source 467 represents all protocol layers above the L2 layer;

the transmitter 456 transmits a radio-frequency signal via a corresponding antenna 460, converts the baseband signal into the radio-frequency signal, and provides the radio-frequency signal to a corresponding antenna 460;

the transmit processor 455 performs various signal receiving processing functions used for L1 layer (i.e., PHY), including decoding, deinterleaving, descrambling, demodulation and extraction of physical layer control signaling;

the controller/processor 490 based on radio resource allocation of the gNB410 performs header compression, encryption, packet segmentation and reordering as well as multiplexing between a logical channel and a transport channel, so as to implement the L2 functions used for user plane and control plane;

the controller/processor 490 is also in charge of HARQ operation, retransmission of a lost packet, and a signaling of the gNB410;

the beam processor 441 determines a first radio signal;

In one subembodiment, the UE 450 device includes at least one processor and at least one memory. The at least one processor and at least one memory, and the at least one memory includes computer program codes; the at least one memory and the computer program codes are configured to be used in collaboration with the at least one processor. The UE 450 at least receives first information and second information; performs a first access detection in a first time window; transmits a first radio signal at a first time, or drops the transmission of a first radio signal at a first time; wherein the first access detection is used for determining whether to transmit the first radio signal at the first time, the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, the UE 450 comprises a memory that stores a computer readable instruction program. The computer readable instruction program generates an action when executed by at least one processor. The action includes receiving first information and second information; performing a first access detection in a first time window; transmitting a first radio signal at a first time, or dropping transmission of a first radio signal at a first time; wherein the first access detection is used for determining whether to transmit the first radio signal at the first time, the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one subembodiment, the gNB 410 comprises at least one processor and at least one memory. The at least one memory comprises computer program codes. The at least one memory and the computer program codes are configured to be used in collaboration with the at least one processor. The gNB 410 at least transmits first information and second information; monitors a first radio signal at a first time; wherein a first access detection performed in a first time window is used for determining whether to transmit the first radio signal at the first time; the first information indicates configuration information of the first radio signal and a first priority class, and the second information indicates a second priority class; the first radio signal is correlated with a first antenna port group, the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one subembodiment, the gNB 410 comprises a memory that stores a computer readable instruction program. The computer readable instruction program generates an action when executed by at least one processor. The action includes transmitting first information and second information; monitoring a first radio signal at a first time; wherein a first access detection performed in a first time window is used for determining whether to transmit the first radio signal at the first time; the first information indicates configuration information of the first radio signal and a first priority class, and the second information indicates a second priority class; the first radio signal is correlated with a first antenna port group, the first antenna port group being spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one subembodiment, the UE 450 corresponds to the UE in the present disclosure.

In one subembodiment, the gNB 410 corresponds to the base station in the present disclosure.

In one subembodiment, at least the first two of the receiver 456, the receiving processor 452 and the controller/processor 490 are used for receiving the first information in the present disclosure.

In one subembodiment, at least the first two of the transmitter 416, the transmitting processor 415 and the controller/processor 440 are used for transmitting the first information in the present disclosure.

In one subembodiment, at least the first two of the receiver 456, the receiving processor 452 and the controller/processor 490 are used for receiving the second information in the present disclosure.

In one subembodiment, at least the first two of the transmitter 416, the transmitting processor 415 and the controller/processor 440 are used for transmitting the second information in the present disclosure.

In one subembodiment, at least the first two of the receiver 456, the receiving processor 452 and the controller/processor 490 are used for performing the first access detection in the present disclosure in the first time window in the present disclosure.

In one subembodiment, at least the first two of the receiver 456, the receiving processor 452 and the controller/processor 490 are used for respectively performing the G energy detection(s) in the present disclosure in G time sub-pool(s) on the first sub-band in the present disclosure.

In one subembodiment, at least the first two of the receiver 456, the receiving processor 452 and the controller/processor 490 are used for respectively performing the P energy detection(s) in the present disclosure in P time sub-pool(s) on the first sub-band in the present disclosure.

In one subembodiment, at least the first two of the transmitter 456, the transmitting processor 455 and the controller/processor 490 are used for transmitting the first radio signal in the present disclosure.

In one subembodiment, at least the first two of the receiver 416, the receiving processor 412 and the controller/processor 440 are used for receiving the first radio signal in the present disclosure.

In one subembodiment, at least the first two of the transmitter 456, the transmitting processor 455 and the controller/processor 490 are used for transmitting the second radio signal in the present disclosure.

In one subembodiment, at least the first two of the receiver 416, the receiving processor 412 and the controller/processor 440 are used for receiving the second radio signal in the present disclosure.

Embodiment 5

Figure 5:
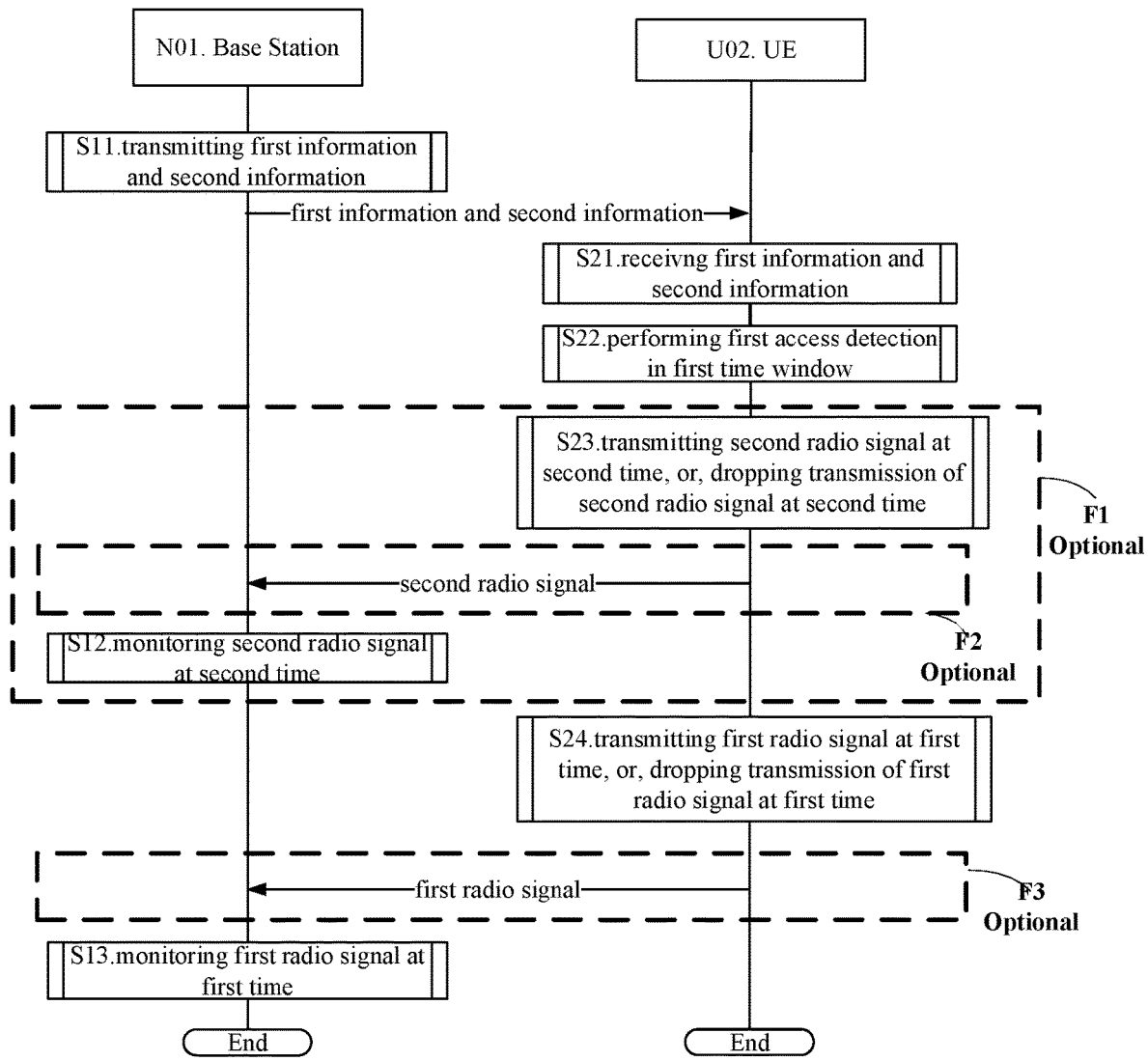
FIG. 5 illustrates a flowchart of wireless transmissions according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, block F1, F2 and F3 are respectively optional.

The N01 transmits first information and second information in step S11; monitors a second radio signal at a second time in step S12; and monitors a first radio signal at a first time in step S13.

The U02 receives first information and second information in step S21; performs a first access detection in a first time window in step S22; transmits a second radio signal at a second time in step S23, or, drops the transmission of a second radio signal at a second time; transmits a first radio signal at a first time in step S24, or, drops the transmission of a first radio signal at a first time.

In Embodiment 5, the first access detection is used by the UE U02 for determining whether to transmit the first radio signal at the first time, the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used by the UE U02 for determining duration of the first time window; or, the first antenna port group is not spatially correlated with the second antenna port group, and only the first priority class between the first priority class and the second priority class is used by the UE U02 for determining duration of the first time window; the first antenna port group comprises a positive integer number of antenna port(s), and the second antenna port group comprises a positive integer number of antenna port(s). The second information indicates configuration information of the second radio signal, the second radio signal being correlated with the second antenna port group, and whether to transmit the second radio signal at the second time is related to whether the first antenna port group is spatially correlated with the second antenna port group.

In one embodiment, a second radio signal is transmitted at a second time in step S23, and a box F2 exists.

In one embodiment, a transmission of a second radio signal is dropped at a second time in step S23, and a box F2 does not exist.

In one embodiment, a first radio signal is transmitted at a first time in step S24, and a box F3 exists.

In one embodiment, the transmission of a first radio signal is dropped at a first time in step S23, and a box F3 does not exist.

In one embodiment, the first access detection comprises:
performing G energy detection(s) respectively in G time sub-pool(s) on a first sub-band to obtain G detection value(s), G being a positive integer;
wherein the first time window comprises the G time sub-pool(s), whether the first antenna port group is spatially correlated with the second antenna port group being used for determining the G.

In one embodiment, the first time window consists of G time sub-pool(s).

In one embodiment, the first sub-band comprises a positive integer number of Physical Resource Block(s) (PRB).

In one embodiment, the first sub-band comprises a positive integer number of consecutive PRBs.

In one embodiment, the first sub-band comprises a positive integer number of Resource Block(s) (RB).

In one embodiment, the first sub-band comprises a positive integer number of consecutive RBs.

In one embodiment, the first sub-band comprises a positive integer number of consecutive subcarriers.

In one embodiment, a number of consecutive sub-carriers comprised in the first sub-band is equal to a positive integral multiple of 12.

In one embodiment, the first sub-band is deployed on the unlicensed spectrum.

In one embodiment, the first sub-band comprises a Carrier.

In one embodiment, the first sub-band comprises a Bandwidth Part (BWP).

In one embodiment, the second information explicitly indicates configuration information of the second radio signal.

In one embodiment, the second information implicitly indicates configuration information of the second radio signal.

In one embodiment, configuration information of the second radio signal explicitly indicates the second antenna port group.

In one embodiment, configuration information of the second radio signal implicitly indicates the second antenna port group.

In one embodiment, configuration information of the second radio signal comprises the second antenna port group.

In one embodiment, configuration information of the second radio signal comprises indexes of all antenna ports in the second antenna port group.

In one embodiment, configuration information of the second radio signal comprises an index(indexes) of the second antenna port group in a given antenna port group set, the given antenna port group set comprises one or more antenna port groups, and the antenna port group comprises one or more antenna ports.

In one subembodiment of the above embodiment, configuration of the given antenna port group set is carried by a higher-layer signaling.

In one subembodiment of the above embodiment, configuration of the given antenna port group set is carried by an RRC signaling.

In one subembodiment of the above embodiment, configuration of the given antenna port group set is all or part of an IE in an RRC signaling.

In one subembodiment of the above embodiment, configuration of the given antenna port group set is carried by an MAC CE signaling.

In one subembodiment of the above embodiment, configuration of the given antenna port group set is transmitted in a SIB.

In one embodiment, the second radio signal comprises at least one of data, control information or a reference signal.

In one embodiment, the second radio signal comprises data.

In one embodiment, the second radio signal comprises control information.

In one embodiment, the second radio signal comprises a reference signal.

In one embodiment, the second radio signal comprises data, control information and a reference signal.

In one embodiment, the second radio signal comprises data and control information.

In one embodiment, the second radio signal comprises control information and a reference signal.

In one embodiment, the second radio signal comprises data and a reference signal.

In one embodiment, the second radio signal is transmitted on the first sub-band.

In one embodiment, the configuration information of the second radio signal includes at least one of an MCS, configuration information of DMRS, a HARQ process number, an RV, an NDI, power control, CSI request, time-frequency resources occupied, the corresponding multi-antenna relevant transmission or the corresponding multi-antenna relevant reception.

In one subembodiment of the above embodiment, configuration information of the DMRS includes one or more of time-domain resources occupied, frequency-domain resources occupied, code-domain resources occupied, cyclic shift or an OCC.

In one subembodiment of the above embodiment, the second radio signal comprises control information.

In one subembodiment of the above embodiment, the second radio signal comprises data.

In one subembodiment of the above embodiment, the second radio signal comprises data and control information.

In one subembodiment of the above embodiment, the second radio signal comprises data and DMRS.

In one subembodiment of the above embodiment, the second radio signal comprises data, DMRS and control information.

In one embodiment, the configuration information of the second radio signal includes at least one of time-domain resources occupied, frequency-domain resources occupied, code-domain resources occupied, cyclic shift, an OCC, antenna port occupied, the corresponding multi-antenna relevant transmission or the corresponding multi-antenna relevant reception.

In one subembodiment of the above embodiment, the second radio signal comprises a reference signal.

In one embodiment, the data is uplink data, the control information is UCI, the reference signal comprises one or more of DMRS, SRS and PTRS.

In one embodiment, the control information comprises at least one of HARQ feedback or CSI.

In one embodiment, the CSI comprises at least one of RI, PMI, CQI or CRI.

In one embodiment, a transmission channel corresponding to the second radio signal is a UL-SCH.

In one embodiment, the second radio signal is transmitted on an uplink physical layer data channel (i.e., an uplink channel can be used for carrying physical layer data).

In one subembodiment of the above embodiment, the uplink physical layer data channel is a PUSCH.

In one subembodiment of the above embodiment, the uplink physical layer data channel is a sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the second radio signal is transmitted on an uplink physical layer control channel (i.e., an uplink channel only capable of carrying a physical layer signaling).

In one subembodiment of the above embodiment, the uplink physical layer control channel is a PUCCH.

In one subembodiment of the above embodiment, the uplink physical layer control channel is an sPDCCH.

In one subembodiment of the above embodiment, the uplink physical layer control channel is an NR-PDCCH.

In one subembodiment of the above embodiment, the uplink physical layer control channel is an NB-PDCCH.

In one embodiment, the second radio signal is transmitted on the first sub-band.

In one embodiment, multi-antenna relevant receptions respectively used by the G energy detection(s) are the same.

In one embodiment, the G energy detection(s) is(are) used for determining whether the first sub-band is idle.

In one embodiment, the G energy detection(s) is(are) used for determining whether the first sub-band can be used by the UE for transmitting the first radio signal.

In one embodiment, the G energy detection(s) is(are) energy detection(s) in LBT, and the specific meaning and implementation method of the LBT can be found in 3GPP TR36.889.

In one embodiment, the G energy detection(s) is(are) energy detection(s) in Clear Channel Assessment (CCA), and the specific meaning and implementation method of the CCA can be found in 3GPP TR36.889.

In one embodiment, any of the G energy detection(s) is implemented in the way defined in 3GPP TS36.213, chapter 15.

In one embodiment, any of the G energy detection(s) is implemented in the way of energy detection in WiFi.

In one embodiment, any of the G energy detection(s) is implemented in the way of performing a measurement on a Received Signal Strength Indication (RSSI).

In one embodiment, any of the G energy detection(s) is implemented in the way of energy detection in LTE LAA.

In one embodiment, time-domain resources occupied by any of the G sub-pool(s) are consecutive.

In one embodiment, each two of the G time sub-pools are orthogonal (not overlapping) in time domain.

In one embodiment, duration of any of the G time sub-pool(s) is one of 16 microsecond or 9 microseconds.

In one embodiment, there exists durations of at least two of the G time sub-pools being not equal.

In one embodiment, durations of any two of the G time sub-pools being equal.

In one embodiment, time-domain resources occupied by the G sub-pool(s) are consecutive.

In one embodiment, there exists time-domain resources occupied by at least two of the G time sub-pools being not consecutive.

In one embodiment, time-domain resources occupied by any two of the G time sub-pools are not consecutive.

In one embodiment, any of the G time sub-pool(s) is a slot duration.

In one embodiment, any of the G time sun-pool(s) is a Tsl, the Tsl being a slot duration, and the specific meaning of the Tsl can be found in 3GPP TS36.213, chapter. 15.

In one embodiment, any time sub-pool other than an earliest one among the G time sub-pools is a slot duration.

In one embodiment, any time sub-pool other than an earliest one among the G time sun-pools is a Tsl, the Tsl being a slot duration, and the specific meaning of the Tsl can be found in 3GPP TS36.213, chapter. 15.

In one embodiment, there exists at least one time sub-pool with duration of 16 microseconds among the G time sub-pool(s).

In one embodiment, there exists at least one time sub-pool with duration of 9 microseconds among the G time sub-pool(s).

In one embodiment, duration of an earliest time sub-pool among the G time sub-pool(s) is 16 microseconds.

In one embodiment, duration of a latest time sub-pool among the G time sub-pool(s) is 9 microseconds.

In one embodiment, the G time sub-pool(s) comprises a monitoring time in CAT 4 LBT.

In one embodiment, the G time sub-pool(s) comprises a slot duration in a Defer duration and a slot duration in a Backoff Time in Cat 4 LBT.

In one embodiment, the G time sub-pool(s) comprises a slot duration in a Defer duration and a slot duration in a Backoff Time in Type 1 UL channel access procedure.

In one embodiment, the G time sub-pool(s) comprises a slot duration in an initial CCA and an Enhanced Clear Channel Assessment (eCCA).

In one embodiment, the G detection value(s) is(are) respectively obtained in the G energy detection(s).

In one embodiment, the G detection value(s) is(are) respectively the received power that the UE senses the power of all radio signals on the first sub-band in G time unit(s) and averages it in time to obtain; the G time unit(s) is(are) respectively duration in the G time sub-pool(s).

In one subembodiment of the above embodiment, duration of any of the G time unit(s) is not less than 4 microseconds.

In one embodiment, the G detection value(s) is(are) respectively the received energy that the UE senses the energy of all radio signals on the first sub-band in G time unit(s) and averages it in time to obtain; the G time unit(s) is(are) respectively duration in the G time sub-pool(s).

In one subembodiment of the above embodiment, duration of any of the G time unit(s) is not less than 4 microseconds.

In one embodiment, any given energy detection of the G energy detection(s) refers to: the UE monitors received power in a given time unit, the given time unit being duration in a time sub-pool corresponding to the given energy detection in the G time sub-pool(s).

In one embodiment, any given energy detection of the G energy detection(s) refers to: the UE monitors received energy in a given time unit, the given time unit being duration in a time sub-pool corresponding to the given energy detection in the G time sub-pool(s).

Embodiment 6

Figure 6:
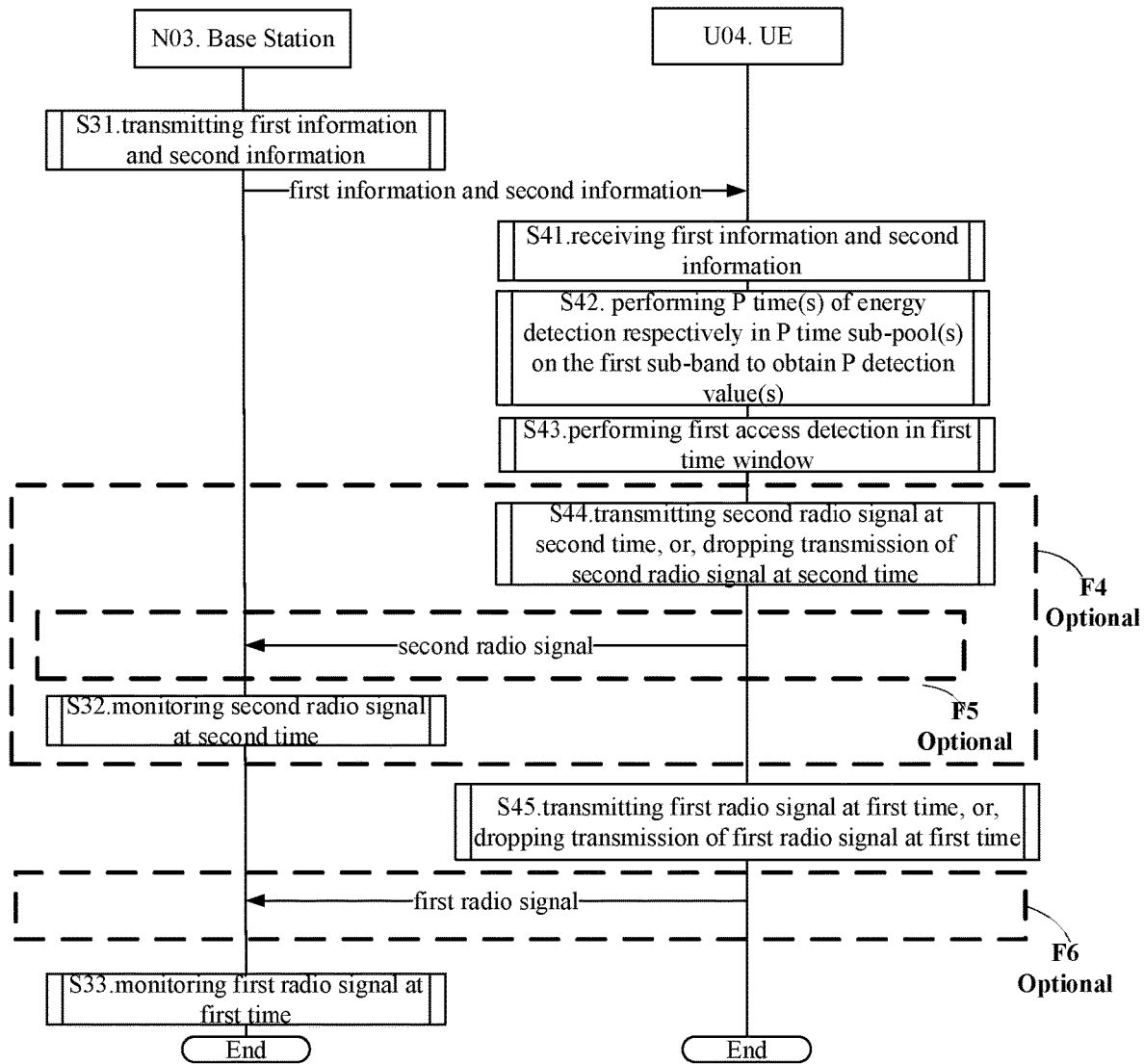
FIG. 6 illustrates a flowchart of wireless transmissions according to another embodiment of the present disclosure.

Embodiment 6 illustrates another flowchart of wireless transmission, as shown in FIG. 6. In FIG. 6, a base station N03 is a maintenance base station for a serving cell of a UE U04. In FIG. 6, blocks F4, F5 and F6 are optional.

The N03 transmits first information and second information in step S31; monitors a second radio signal at a second time in step S32; and monitors a first radio signal at a first time in step S33.

The U04 receives first information and second information in step S41; performs P energy detection(s) respectively in P time sub-pool(s) on the first sub-band to obtain P detection value(s) in step S42; performs a first access detection in a first time window in step S43; transmits a second radio signal at a second time in step S44, or drops the transmission of a second radio signal at a second time; transmits a first radio signal at a first time in step S45, or drops the transmission of a first radio signal at a first time.

In Embodiment 6, the first access detection is used by the UE U04 for determining whether the first radio signal is transmitted at the first time, the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used by the UE U04 for determining duration of the first time window; or, the first antenna port group is not spatially correlated with the second antenna port group, and only the first priority class between the first priority class and the second priority class is used by the UE U04 for determining duration of the first time window; the first antenna port group comprises a positive integer number of antenna port(s), and the second antenna port group comprises a positive integer number of antenna port(s). The P is a positive integer, and the second priority class is used for determining the P, the P energy detection(s) being correlated with the second antenna port group, a start time of the P time sub-pool(s) being earlier than a start time of the first time window; the first antenna port group is spatially correlated with the second antenna port group, the first priority class is greater than the second priority class, or the first antenna port group is not spatially correlated with the second antenna port group. The second information indicates configuration information of the second radio signal, the second radio signal being correlated with the second antenna port group, and whether the second radio signal is transmitted at the second time is related to whether the first antenna port group is spatially correlated with the second antenna port group.

In one embodiment, a second radio signal is transmitted at a second time in step S44, and a box F5 exists.

In one embodiment, the transmission of a second radio signal is dropped at a second time in step S44, and a box F5 does not exist.

In one embodiment, a first radio signal is transmitted at a first time in step S45, and a box F6 exists.

In one embodiment, the transmission of a first radio signal is dropped at a first time in step S45, and a box F6 does not exist.

Embodiment 7

Figure 7:
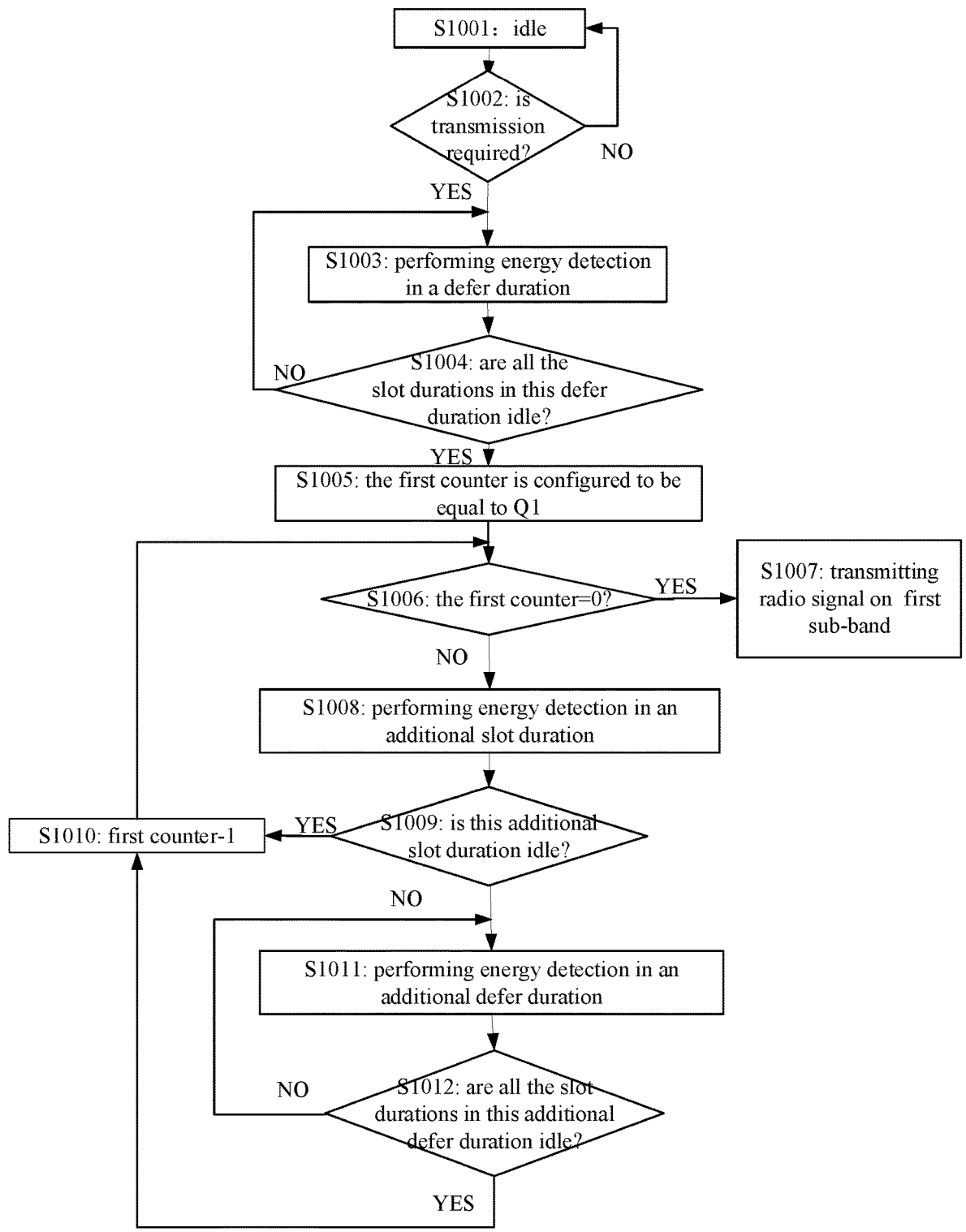
FIG. 7 illustrates a schematic diagram illustrating a given access detection or Q time(s) of power detection being used to determine whether a given radio signal is transmitted at a given time according to one embodiment of the present disclosure.
Figure 8A:
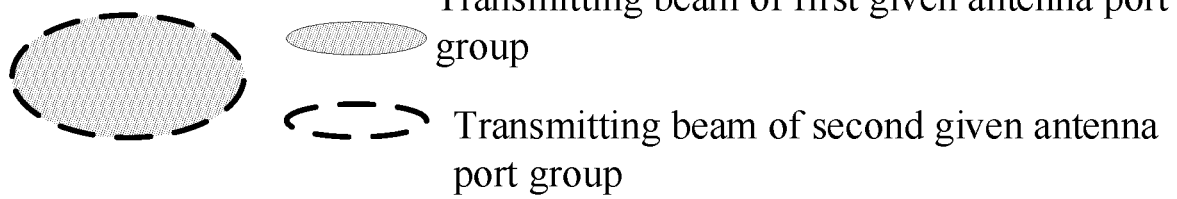
FIG. 8A-8B respectively illustrate a schematic diagram illustrating a first given antenna port group being spatially correlated with a second given antenna port group according to one embodiment of the present disclosure.
Figure 8B:
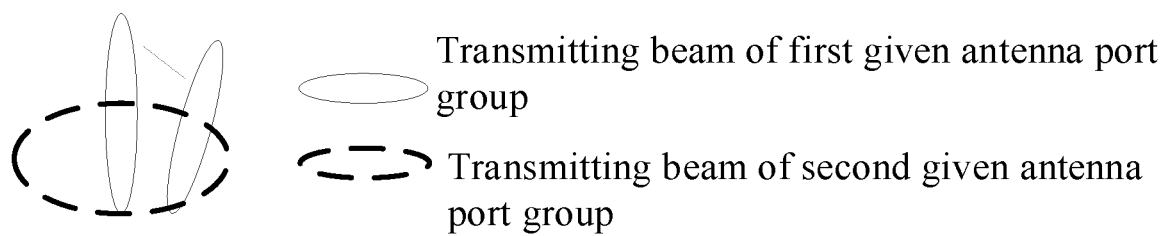
Figure 9A:
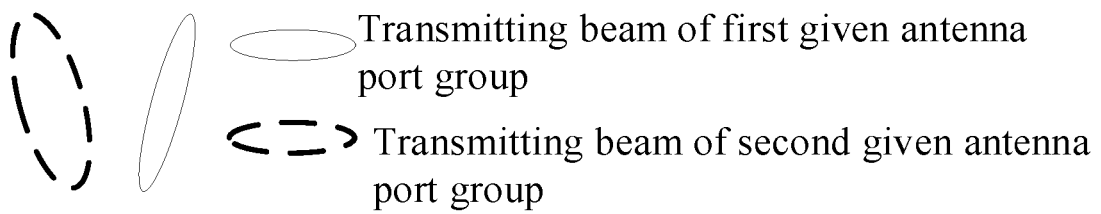
FIG. 9A-9B respectively illustrate a schematic diagram illustrating a first given antenna port group being not spatially correlated with a second given antenna port group according to one embodiment of the present disclosure.
Figure 9B:
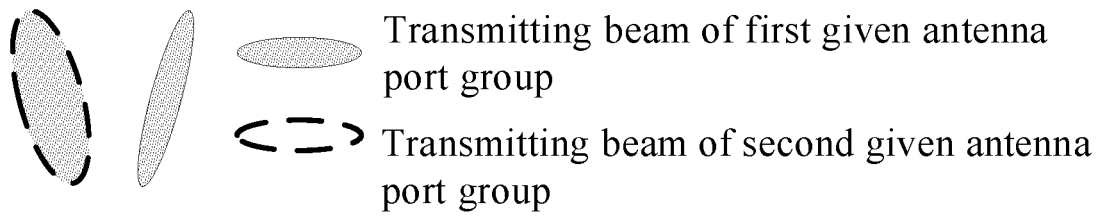

Embodiment 7 illustrates a schematic diagram illustrating a given access detection or Q time(s) of power detection being used for determining whether a given radio signal is transmitted at a given time; as shown in FIG. 7.

In Embodiment 7, the given access detection comprises performing the Q energy detection(s) respectively in Q time sub-pool(s) on a given sub-band to obtain Q detection value(s), the Q being a positive integer. The given access detection corresponds to the first access detection in the present disclosure; the Q time sub-pool(s) correspond(s) to the G time sub-pool(s) in the present disclosure, and the Q energy detection(s) correspond(s) to the G energy detection(s) in the present disclosure; the given time corresponds to the first time in the present disclosure, and the given radio signal corresponds to the first radio signal in the present disclosure; or, the Q time sub-pool(s) correspond(s) to the P time sub-pool(s) in the present disclosure, and the Q energy detection(s) correspond(s) to the P energy detection(s) in the present disclosure; the given time corresponds to the second time in the present disclosure, and the given radio signal corresponds to the second radio signal in the present disclosure; the given priority class corresponds to the first priority class or the second priority class in the present disclosure. The given access detection or the process of the Q energy detection(s) can be described by the flowchart in FIG. 7.

In FIG. 7, the UE is idle in step S1001, and determines whether the transmission is required in step S1002; performs an energy detection within a defer duration in step S1003; determines whether all slot durations in the defer duration are idle in step S1004, If so, sets a first counter to be equal to Q1 in step S1005, the Q1 being an integer not greater than the Q; otherwise, returns to step S1004; determines whether the first counter is 0 in step S1006, if so, transmits a radio signal on the first sub-band in the present disclosure; otherwise, performs energy detection within an additional slot duration in step S1008; determines whether the additional slot duration is idle in step S1009, if so, reduces the first counter by 1 in step S1010, and then returns to step 1006; otherwise, performs energy detection within an additional defer duration in step S1011; and determines whether all slot durations in the additional defer duration are idle in step S1012, if so, go to step S1010; otherwise, return to step S1011.

In Embodiment 7, the first counter before the given time in FIG. 7 is reset, the given radio signal can be transmitted at the given time, otherwise the given radio signal cannot be transmitted at the given time. A condition for resetting the first counter is that Q1 detection value(s) among the Q detection value(s) corresponding to Q1 time sub-pool(s) among the Q time sub-pool(s) is(are) lower than a first threshold, a start time of the Q1 time sub-pool(s) is after the step S1005 in FIG. 7.

In one embodiment, the Q time sub-pool(s) comprise(s) all defer durations in FIG. 7.

In one embodiment, the Q time sub-pool(s) comprise(s) part of defer durations in FIG. 7.

In one embodiment, the Q time sub-pool(s) comprise(s) all defer durations and all additional slot durations in FIG. 7.

In one embodiment, the Q time sub-pool(s) comprise(s) part of defer durations and part of additional slot durations in FIG. 7.

In one embodiment, the Q time sub-pool(s) comprise(s) all defer durations, all additional slot durations and all additional defer durations in FIG. 7.

In one embodiment, the Q time sub-pool(s) comprise(s) all defer durations, part of additional slot durations and all additional defer durations in FIG. 7.

In one embodiment, the Q time sub-pool(s) comprise(s) all defer durations, part of additional slot durations and part of additional defer durations in FIG. 7.

In one embodiment, duration of any of the Q time sub-pool(s) is one of 16 microsecond or 9 microseconds.

In one embodiment, any slot duration in a given time duration is one of the Q time sub-pool(s); the given time duration is any of all defer durations, all additional slot durations, and all additional defer durations comprised in FIG. 7.

In one embodiment, performing energy detections in a given time duration refers to: performing energy detections in all slot durations in the given time duration; the given time duration is any of all defer durations, all additional slot durations, and all additional defer durations comprised in FIG. 7.

In one embodiment, the phrase that being determined to be idle in a given time duration by energy detections refers to: all slot durations comprised in the given duration are determined to be idle by energy detections; the given time duration is any of all defer durations, all additional slot durations, and all additional defer durations comprised in FIG. 7.

In one embodiment, the phrase that being determined to be idle in a given slot duration by energy detections refers to: the UE senses power of all radio signals on the given sub-band in a given time unit and averages it in time to obtain received power, which is lower than the first threshold; and the given time unit is duration in the given slot duration;

In one subembodiment of the above embodiment, duration of the given time unit is not less than 4 microseconds.

In one embodiment, the phrase that being determined to be idle in a given slot duration by energy detections refers to: the UE senses energy of all radio signals on the given sub-band in a given time unit and averages it in time to obtain received energy, which is lower than the first threshold; and the given time unit is duration in the given slot duration;

In one subembodiment of the above embodiment, duration of the given time unit is not less than 4 microseconds.

In one embodiment, the phrase that an energy detection (energy detections) is(are) performed in a given time duration refers to: an energy detection(energy detections) is(are) performed in all time sub-pool(s) in the given time duration; the given time duration is any of all defer durations, all additional slot durations and all additional defer durations comprised in FIG. 7, and the all time sub-pool(s) belong(s) to the Q time sub-pool(s).

In one embodiment, the phrase that being determined to be idle in a given time duration by energy detections refers to: detection value(s) obtained by energy detection(s) of all time sub-pool(s) comprised in the given time period is(are) lower than the first threshold; the given time duration is any of all defer durations, all additional slot durations and all additional defer durations comprised in FIG. 7; the all time sub-pool(s) belong(s) to the Q time sub-pool(s), and the detection value(s) belong(s) to the Q detection value(s).

In one embodiment, duration of a defer duration is 16 microseconds plus M1 9 microseconds, the M1 being a positive integer.

In one subembodiment of the above embodiment, a defer duration comprises M1+1 time sub-pools among the Q time sub-pools In one reference embodiment of the above subembodiment, duration of a first time sub-pool among the M1+1 time sub-pools is 16 microseconds, and that of each of the other M1 time sub pool(s) is 9 microseconds.

In one subembodiment of the above embodiment, the given priority class is used for determining the M1.

In one reference embodiment of the above subembodiment, the given priority class is a Channel Access Priority Class, and the definition of the Channel Access Priority Class can be found in 3GPP TS36.213, chapter. 15.

In one subembodiment of the above embodiment, the M1 belongs to 1, 2, 3 and 7.

In one embodiment, a defer duration comprises a plurality of slot durations.

In one subembodiment of the above embodiment, a first slot duration and a second slot duration among the plurality of slot durations are non-consecutive.

In one subembodiment of the above embodiment, a time interval between a first slot duration and a second slot duration among the plurality of slot durations is 7 milliseconds.

In one embodiment, duration of an additional defer duration is 16 microseconds plus M2 9 microseconds, the M2 being a positive integer.

In one subembodiment of the above embodiment, an additional defer duration comprises M2+1 time sub-pools among the Q time sub-pools.

In one reference embodiment of the above subembodiment, duration of a first time sub-pool among the M2+1 time sub-pools is 16 microseconds, and that of each of the other M2 time sub pool(s) is 9 microseconds.

In one subembodiment of the above embodiment, the given priority class is used for determining the M2.

In one subembodiment of the above embodiment, the M2 belongs to 1, 2, 3 and 7.

In one embodiment, duration of a defer duration is equal to duration of an additional defer duration.

In one embodiment, the M1 is equal to the M2.

In one embodiment, an additional defer duration comprises a plurality of slot durations.

In one subembodiment of the above embodiment, a first slot duration and a second slot duration among the plurality of slot durations are non-consecutive.

In one subembodiment of the above embodiment, a time interval between a first slot duration and a second slot duration among the plurality of slot durations is 7 milliseconds.

In one embodiment, duration of a slot duration is 9 microseconds.

In one embodiment, a slot duration is one of the Q time sub-pool(s).

In one embodiment, duration of an additional slot duration is 9 microseconds.

In one embodiment, an additional slot duration comprises one of the Q time sub-pool(s).

In one embodiment, the Q energy detection(s) is(are) used for determining whether the given sub-band is idle.

In one embodiment, the Q energy detection(s) is(are) used for determining whether the given sub-band can be used by the UE for transmitting the given radio signal.

In one embodiment, the Q detection value(s) is(are) all measured by dBm.

In one embodiment, the Q detection value(s) is(are) all measured by mW.

In one embodiment, the Q detection value(s) is(are) all measured by joules.

In one embodiment, the Q1 is less than the Q.

In one embodiment, the Q is greater than 1.

In one embodiment, the first threshold is measured by dBm.

In one embodiment, the first threshold is measured by mW.

In one embodiment, the first threshold is measured by Joule.

In one embodiment, the first threshold is equal to or less than −72 dBm.

In one embodiment, the first threshold is equal to or less than any value of a first given value.

In one subembodiment of the above embodiment, the first given value is pre-defined.

In one subembodiment of the above embodiment, the first given value is configured by a higher-layer signaling.

In one embodiment, the first threshold is freely selected by the UE under the condition of being equal to or less than a first given value.

In one subembodiment of the above embodiment, the first given value is pre-defined.

In one subembodiment of the above embodiment, the first given value is configured by a higher-layer signaling.

In one embodiment, the Q energy detection(s) is(are) energy detection(s) in Cat 4 LBT process, and the Q1 is a CWp in the Cat 4 LBT process, the CWp being the size of a contention window, and the specific meaning of the CWp can be found in 3GPP TS36.213, chapter 15.

In one embodiment, at least one of the Q detection value(s) not belonging to the Q1 detection value(s) is lower than the first threshold.

In one embodiment, at least one of the Q detection value(s) not belonging to the Q1 detection value(s) is not lower than the first threshold.

In one embodiment, durations of any two of the Q1 time sub-pools are equal.

In one embodiment, there are durations of at least two of the Q1 time sub-pools being unequal.

In one embodiment, the Q1 time sub-pool(s) comprises a latest one among the Q time sub-pool(s).

In one embodiment, the Q1 time sub-pool(s) only comprise(s) a slot duration in an eCCA.

In one embodiment, the Q time sub-pool(s) comprises the Q1 time sub-pool(s) and Q2 time sub-pool(s), and any of the Q2 time sub-pool(s) does not belong to the Q1 time sub-pool(s), the Q2 being a positive integer not greater than the Q minus the Q1.

In one subembodiment of the above embodiment, the Q2 time sub-pool(s) comprise(s) a slot duration in an initial CCA.

In one subembodiment of the above embodiment, positions of the Q2 time sub-pools in the Q time sub-pools are consecutive.

In one subembodiment of the above embodiment, a detection value corresponding to at least one of the Q2 time sub-pool(s) is lower than the first threshold.

In one subembodiment of the above embodiment, a detection value corresponding to at least one of the Q2 time sub-pool(s) is not lower than the first threshold.

In one subembodiment of the above embodiment, the Q2 time sub-pool(s) comprise(s) all slot durations in all defer durations.

In one subembodiment of the above embodiment, the Q2 time sub-pool(s) comprise(s) all slot durations in at least one defer duration.

In one subembodiment of the above embodiment, the Q2 time sub-pool(s) comprise(s) at least one additional slot duration.

In one subembodiment of the above embodiment, the Q2 time sub-pool(s) comprise(s) all additional slot durations that are determined to be non-idle by energy detections in FIG. 7 and all slot durations in all additional defer durations.

In one embodiment, the Q1 time sub-pool(s) respectively belong(s) to Q1 sub-pool set(s), and any of the Q1 sub-pool set(s) comprises a positive integer number of time sub-pool(s) among the Q time sub-pool(s); a detection value corresponding to any time sub-pool in the Q1 sub-pool set(s) is lower than the first threshold.

In one subembodiment of the above embodiment, a number of time sub-pool comprised in at least one sub-pool set among the Q1 sub-pool set(s) is equal to 1.

In one subembodiment of the above embodiment, a number of time sub-pools comprised in at least one of the Q1 sub-pool set(s) is greater than 1.

In one subembodiment of the above embodiment, a number of time sub-pools comprised in at least two of the Q1 sub-pool sets is unequal.

In one subembodiment of the above embodiment, there does not exist a time sub-pool among the Q time sub-pool(s) simultaneously belongs to two of the Q1 sub-pool sets.

In one subembodiment of the above embodiment, all time sub-pools in any of the Q1 sub-pool set(s) belong to a same additional defer duration or an additional slot duration determined to be idle by energy detections.

In one subembodiment of the above embodiment, at least one detection value corresponding to a time sub-pool in the Q time sub-pool(s) that does not belong to the Q1 sub-pool set(s) is lower than the first threshold.

In one subembodiment of the above embodiment, at least one detection value corresponding to a time sub-pool in the Q time sub-pool(s) that does not belong to the Q1 sub-pool set(s) is not lower than the first threshold.

Embodiment 8

Embodiment 8A to Embodiment 8B respectively illustrate schematic diagrams of a first given antenna port group being spatially correlated with a second given antenna port group.

In Embodiment 8, the first given antenna port group corresponds to the first antenna port group in the present disclosure, and the second given antenna port group corresponds to the second antenna port group in the present disclosure.

In one embodiment, the phrase that the first given antenna port group is spatially correlated with the second given antenna port group refers to: the second given antenna port group comprises all antenna ports in the first given antenna port group.

In one embodiment, the first given antenna port group is spatially correlated with the second given antenna port group, and a transmitting or receiving antenna or antenna group transmitting a radio signal on the second given antenna port group comprises all transmitting or receiving antennas or antenna groups transmitting radio signals on the first given antenna port group.

In one embodiment, the first given antenna port group is spatially correlated with the second given antenna port group, and a transmitting antenna or antenna group transmitting a radio signal on the second given antenna port group comprises all transmitting antennas or antenna groups transmitting radio signals on the first given antenna port group.

In one embodiment, the first given antenna port group is spatially correlated with the second given antenna port group, and a receiving antenna or antenna group transmitting a radio signal on the second given antenna port group comprises all receiving antennas or antenna groups transmitting radio signals on the first given antenna port group.

In one embodiment, the first given antenna port group is spatially correlated with the second given antenna port group, and a transmitting antenna or antenna group transmitting a radio signal on the second given antenna port group comprises all receiving antennas or antenna groups transmitting radio signals on the first given antenna port group.

In one embodiment, the first given antenna port group is spatially correlated with the second given antenna port group, and a receiving antenna or antenna group transmitting a radio signal on the second given antenna port group comprises all transmitting antennas or antenna groups transmitting radio signals on the first given antenna port group.

In one embodiment, the first given antenna port group is spatially correlated with the second given antenna port group; a second antenna group is one or more antenna groups generating a multi-antenna relevant transmission or a multi-antenna relevant reception transmitting a radio signal on the second given antenna port group, and a first antenna group is one or more antenna groups generating a multi-antenna relevant transmission or a multi-antenna relevant reception transmitting a radio signal on the first given antenna port group, the second antenna group comprising all antennas or antenna groups in the first antenna group.

In one embodiment, the first given antenna port group is spatially correlated with the second given antenna port group; a second antenna group is one or more antenna groups generating a multi-antenna relevant transmission transmitting a radio signal on the second given antenna port group, and a first antenna group is one or more antenna groups generating a multi-antenna relevant transmission transmitting a radio signal on the first given antenna port group, the second antenna group comprising all antennas or antenna groups in the first antenna group.

In one embodiment, the first given antenna port group is spatially correlated with the second given antenna port group; a second antenna group is one or more antenna groups generating a multi-antenna relevant reception transmitting a radio signal on the second given antenna port group, and a first antenna group is one or more antenna groups generating a multi-antenna relevant reception transmitting a radio signal on the first given antenna port group, the second antenna group comprising all antennas or antenna groups in the first antenna group.

In one embodiment, the first given antenna port group is spatially correlated with the second given antenna port group; a second antenna group is one or more antenna groups generating a multi-antenna relevant transmission transmitting a radio signal on the second given antenna port group, and a first antenna group is one or more antenna groups generating a multi-antenna relevant reception transmitting a radio signal on the first given antenna port group, the second antenna group comprising all antennas or antenna groups in the first antenna group.

In one embodiment, the phrase that the first given antenna port group is spatially correlated with the second given antenna port group refers to: the second given antenna port group comprises part of antenna ports in the first given antenna port group, and any antenna port in the first given antenna port group that does not belong to the second given antenna port group and at least one antenna port in the second given antenna port group are Quasi Co-Located (QCL).

In one embodiment, the phrase that the first given antenna port group is spatially correlated with the second given antenna port group refers to: the second given antenna port group comprises part of antenna ports in the first given antenna port group, and any antenna port in the first given antenna port group that does not belong to the second given antenna port group and one antenna port in the second given antenna port group are QCL.

In one embodiment, the phrase that the first given antenna port group is spatially correlated with the second given antenna port group refers to: the second given antenna port group comprises part of antenna ports in the first given antenna port group, and any antenna port in the first given antenna port group that does not belong to the second given antenna port group and at least one antenna port in the second given antenna port group are spatial QCL.

In one embodiment, the phrase that the first given antenna port group is spatially correlated with the second given antenna port group refers to: the second given antenna port group comprises part of antenna ports in the first given antenna port group, and any antenna port in the first given antenna port group that does not belong to the second given antenna port group and one antenna port in the second given antenna port group are spatial QCL.

In one embodiment, the phrase that the first given antenna port group is spatially correlated with the second given antenna port group refers to: any antenna port in the first given antenna port group and at least one antenna port in the second given antenna port group are QCL.

In one embodiment, the phrase that the first given antenna port group is spatially correlated with the second given antenna port group refers to: any antenna port in the first given antenna port group and one antenna port in the second given antenna port group are QCL.

In one embodiment, the phrase that the first given antenna port group is spatially correlated with the second given antenna port group refers to: any antenna port in the first given antenna port group and at least one antenna port in the second given antenna port group are spatial QCL.

In one embodiment, the phrase that the first given antenna port group is spatially correlated with the second given antenna port group refers to: any antenna port in the first given antenna port group and one antenna port in the second given antenna port group are spatial QCL.

In one embodiment, the phrase that two antenna ports are QCL refers to: all or part of large-scale properties of a radio signal transmitted on one of the two antenna ports can be inferred from all or part of large-scale properties transmitted on the other of the two antenna ports.

In one embodiment, the phrase that two antenna ports are QCL refers to: the two antenna ports at least have a same QCL parameter, which comprises a multi-antenna relevant QCL parameter and a multi-antenna irrelevant QCL parameter.

In one embodiment, the phrase that two antenna ports are QCL refers to: at least one QCL parameter of one of the two antenna ports can be inferred from at least one QCL parameter of the other of the two antenna port.

In one embodiment, the phrase that two antenna ports are QCL refers to: a multi-antenna relevant reception of a radio signal transmitted on one of the two antenna ports can be inferred from a multi-antenna relevant reception of a radio signal transmitted on the other of the two antenna ports.

In one embodiment, the phrase that two antenna ports are QCL refers to: a multi-antenna relevant transmission of a radio signal transmitted on one of the two antenna ports can be inferred from a multi-antenna relevant transmission of a radio signal transmitted on the other of the two antenna ports.

In one embodiment, the phrase that two antenna ports are QCL refers to: a multi-antenna relevant transmission of a radio signal transmitted on one of the two antenna ports can be inferred from a multi-antenna relevant reception of a radio signal transmitted on the other of the two antenna ports, and a receiver of the radio signal transmitted on one of the two antenna ports is the same as a transmitter of the radio signal transmitted on the other of the two antenna ports.

In one embodiment, a multi-antenna relevant QCL parameter comprises: one or more of an angle of arrival, an angle of departure, a spatial correlation, a multi-antenna relevant transmission and a multi-antenna relevant reception.

In one embodiment, a multi-antenna irrelevant QCL parameter comprises: one or more of a delay spread, a Doppler spread, a Doppler shift, a pathloss and an average gain.

In one embodiment, the phrase that two antenna ports are spatial QCL refers to: all or part of multi-antenna relevant large-scale properties of a radio signal transmitted on one of the two antenna ports can be inferred from all or part of multi-antenna relevant large-scale properties of a radio signal transmitted on the other of the two antenna ports.

In one embodiment, the phrase that two antenna ports are spatial QCL refers to: the two antenna ports at least have a same multi-antenna relevant spatial QCL parameter.

In one embodiment, the phrase that two antenna ports are spatial QCL refers to: at least one multi-antenna relevant QCL parameter of one of the two antenna ports can be inferred from at least one multi-antenna relevant QCL parameter of the other of the two antenna ports.

In one embodiment, the phrase that two antenna ports are spatial QCL refers to: a multi-antenna relevant reception of a radio signal transmitted on one of the two antenna ports can be inferred from a multi-antenna relevant reception of a radio signal transmitted on the other of the two antenna ports.

In one embodiment, the phrase that two antenna ports are spatial QCL refers to: a multi-antenna relevant transmission of a radio signal transmitted on one of the two antenna ports can be inferred from a multi-antenna relevant transmission of a radio signal transmitted on the other of the two antenna ports.

In one embodiment, the phrase that two antenna ports are spatial QCL refers to: a multi-antenna relevant transmission of a radio signal transmitted on one of the two antenna ports can be inferred from a multi-antenna relevant reception of a radio signal transmitted on the other of the two antenna ports, and a transmitter of the radio signal transmitted on one of the two antenna ports is the same as a receiver of the radio signal transmitted on the other of the two antenna ports.

In one embodiment, multi-antenna relevant large-scale properties of a given radio signal comprise one or more of an angle of arrival, an angle of departure, a spatial correlation, a multi-antenna relevant transmission and a multi-antenna relevant reception.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving beamforming vector.

In one embodiment, the multi-antenna relevant reception refers to receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting beamforming vector.

In one embodiment, the multi-antenna relevant transmission refers to transmitting spatial filtering.

In one embodiment, the Embodiment 8A corresponds to a schematic diagram of the first given antenna port group being spatially correlated with the second given antenna port group wherein a transmitting beam of the first given antenna port group is the same with that of the second given antenna port group.

In one embodiment, the Embodiment 8B corresponds to a schematic diagram of the first given antenna port group being spatially correlated with the second given antenna port group wherein a transmitting beam of the second given antenna port group comprises a transmitting beam of the first given antenna port group.

Embodiment 9

Embodiment 9A to Embodiment 9B respectively illustrate schematic diagrams of a first given antenna port group being not spatially correlated with a second given antenna port group.

In Embodiment 9, the first given antenna port group corresponds to the first antenna port group in the present disclosure, and the second given antenna port group corresponds to the second antenna port group in the present disclosure.

In one embodiment, the phrase that the first given antenna port group is not spatially correlated with the second given antenna port group refers to: the second given antenna port group does not comprise all antenna ports in the first given antenna port group.

In one embodiment, the phrase that the first given antenna port group is not spatially correlated with the second given antenna port group refers to: the second given antenna port group does not comprise at least one antenna port in the first given antenna port group.

In one embodiment, the phrase that the first given antenna port group is not spatially correlated with the second given antenna port group refers to: all antenna ports in the second given antenna port group and all antenna ports in the first given antenna port group can transmit radio signals simultaneously.

In one embodiment, the phrase that the first given antenna port group is not spatially correlated with the second given antenna port group refers to: a radio signal transmitted on any antenna port in the second given antenna port group and a radio signal transmitted on any antenna port in the first given antenna port group can be received simultaneously.

In one embodiment, the phrase that the first given antenna port group is not spatially correlated with the second given antenna port group refers to: being able to transmit a radio signal on any antenna port in the second given antenna port group and receive a radio signal transmitted by any antenna port in the first given antenna port group simultaneously.

In one embodiment, the phrase that the first given antenna port group is not spatially correlated with the second given antenna port group refers to: being able to transmit a radio signal on any antenna port in the first given antenna port group and receive a radio signal transmitted by any antenna port in the second given antenna port group simultaneously.

In one embodiment, the phrase that the first given antenna port group is not spatially correlated with the second given antenna port group refers to: being able to simultaneously perform a transmission or a reception of a radio signal on any antenna port in the first given antenna port group and transmit or receive simultaneously a radio signal transmitted on any antenna port in the second given antenna port group.

In one embodiment, the phrase that the first given antenna port group is not spatially correlated with the second given antenna port group refers to: a transmitting or receiving antenna or antenna group transmitting a radio signal on any antenna port in the second given antenna port group and a transmitting or receiving antenna or antenna group transmitting a radio signal on any antenna port in the first given antenna port group do not comprise a same antenna or antenna group.

In one embodiment, the phrase that the first given antenna port group is not spatially correlated with the second given antenna port group refers to: an antenna or antenna group transmitting a radio signal on any antenna port in the second given antenna port group and an antenna or antenna group transmitting a radio signal on any antenna port in the first given antenna port group do not comprise a same antenna or antenna group.

In one embodiment, the phrase that the first given antenna port group is not spatially correlated with the second given antenna port group refers to: a receiving antenna or antenna group transmitting a radio signal on any antenna port in the second given antenna port group and a receiving antenna or antenna group transmitting a radio signal on any antenna port in the first given antenna port group do not comprise a same antenna or antenna group.

In one embodiment, the phrase that the first given antenna port group is not spatially correlated with the second given antenna port group refers to: an antenna or antenna group transmitting a radio signal on any antenna port in the second given antenna port group and an receiving antenna or antenna group transmitting a radio signal on any antenna port in the first given antenna port group do not comprise a same antenna or antenna group.

In one embodiment, the phrase that the first given antenna port group is not spatially correlated with the second given antenna port group refers to: an antenna or antenna group transmitting a radio signal on any antenna port in the first given antenna port group and an receiving antenna or antenna group transmitting a radio signal on any antenna port in the second given antenna port group do not comprise a same antenna or antenna group.

In one embodiment, the phrase that the first given antenna port group is not spatially correlated with the second given antenna port group refers to: a second antenna group is one or more antenna groups that generate a multi-antenna relevant transmission or a multi-antenna relevant reception transmitting a radio signal on any antenna port in the second given antenna port group; a first antenna group is one or more antenna groups that generate a multi-antenna relevant transmission or a multi-antenna relevant reception of any antenna port in the first given antenna port group; and the first antenna group and the second antenna group do not comprise a same antenna or antenna group.

In one embodiment, the phrase that the first given antenna port group is not spatially correlated with the second given antenna port group refers to: a second antenna group is one or more antenna groups that generate a multi-antenna relevant transmission transmitting a radio signal on any antenna port in the second given antenna port group; a first antenna group is one or more antenna groups that generate a multi-antenna relevant transmission of any antenna port in the first given antenna port group; the first antenna group and the second antenna group do not comprise a same antenna or antenna group.

In one embodiment, the phrase that the first given antenna port group is not spatially correlated with the second given antenna port group refers to: a second antenna group is one or more antenna groups that generate a multi-antenna relevant reception transmitting a radio signal on any antenna port in the second given antenna port group; a first antenna group is one or more antenna groups that generate a multi-antenna relevant reception of any antenna port in the first given antenna port group; the first antenna group and the second antenna group do not comprise a same antenna or antenna group.

In one embodiment, the phrase that the first given antenna port group is not spatially correlated with the second given antenna port group refers to: a second antenna group is one or more antenna groups that generate a multi-antenna relevant transmission transmitting a radio signal on any antenna port in the second given antenna port group; a first antenna group is one or more antenna groups that generate a multi-antenna relevant reception of any antenna port in the first given antenna port group; the first antenna group and the second antenna group do not comprise a same antenna or antenna group.

In one embodiment, the phrase that the first given antenna port group is not spatially correlated with the second given antenna port group refers to: a second antenna group is one or more antenna groups that generate a multi-antenna relevant reception transmitting a radio signal on any antenna port in the second given antenna port group; a first antenna group is one or more antenna groups that generate a multi-antenna relevant transmission of any antenna port in the first given antenna port group; the first antenna group and the second antenna group do not comprise a same antenna or antenna group.

In one embodiment, the phrase that the first given antenna port group is not spatially correlated with the second given antenna port group refers to: at least one antenna port in the first given antenna port group cannot transmit a radio signal simultaneously with at least one antenna port in the second given antenna port group.

In one embodiment, the phrase that the first given antenna port group is not spatially correlated with the second given antenna port group refers to: a transmission or reception of a radio signal on at least one antenna port in the first given antenna port group and a transmission or reception of a radio signal on at least one antenna port in the second given antenna port group cannot be performed simultaneously.

In one embodiment, the phrase that the first given antenna port group is not spatially correlated with the second given antenna port group refers to: a reception transmitting a radio signal on at least one antenna port in the first given antenna port group and a reception transmitting a radio signal on at least one antenna port in the second given antenna port group cannot be performed simultaneously.

In one embodiment, the phrase that the first given antenna port group is not spatially correlated with the second given antenna port group refers to: a transmission of a radio signal on at least one antenna port in the first given antenna port group and a reception transmitting a radio signal on at least one antenna port in the second given antenna port group cannot be performed simultaneously.

In one embodiment, the phrase that the first given antenna port group is not spatially correlated with the second given antenna port group refers to: a transmission of a radio signal on at least one antenna port in the second given antenna port group and a reception transmitting a radio signal on at least one antenna port in the first given antenna port group cannot be performed simultaneously.

In one embodiment, the phrase that the first given antenna port group is not spatially correlated with the second given antenna port group refers to: any antenna port in the first given antenna port group cannot transmit a radio signal simultaneously with at least one antenna port in the second given antenna port group.

In one embodiment, the phrase that the first given antenna port group is not spatially correlated with the second given antenna port group refers to: a transmission or reception of a radio signal on any antenna port in the first given antenna port group and a transmission or reception of a radio signal on at least one antenna port in the second given antenna port group cannot be performed simultaneously.

In one embodiment, the phrase that the first given antenna port group is not spatially correlated with the second given antenna port group refers to: a reception transmitting a radio signal on any antenna port in the first given antenna port group and a reception transmitting a radio signal on at least one antenna port in the second given antenna port group cannot be performed simultaneously.

In one embodiment, the phrase that the first given antenna port group is not spatially correlated with the second given antenna port group refers to: a transmission of a radio signal on any antenna port in the first given antenna port group and a reception transmitting a radio signal on at least one antenna port in the second given antenna port group cannot be performed simultaneously.

In one embodiment, the phrase that the first given antenna port group is not spatially correlated with the second given antenna port group refers to: a transmission of a radio signal on at least one antenna port in the second given antenna port group and a reception transmitting a radio signal on any antenna port in the first given antenna port group cannot be performed simultaneously.

In one embodiment, the first given antenna port group is not spatially correlated with the second given antenna port group, and a transmitting or receiving antenna or antenna group transmitting a radio signal on the second given antenna port group comprises at least one transmitting or receiving antenna or antenna group transmitting a radio signal on the first given antenna port group.

In one embodiment, the first given antenna port group is not spatially correlated with the second given antenna port group, and a transmitting antenna or antenna group transmitting a radio signal on the second given antenna port group comprises at least one transmitting antenna or antenna group of a radio signal on the first given antenna port group.

In one embodiment, the first given antenna port group is not spatially correlated with the second given antenna port group, and a receiving antenna or antenna group transmitting a radio signal on the second given antenna port group comprises at least one receiving antenna or antenna group transmitting a radio signal on the first given antenna port group.

In one embodiment, the first given antenna port group is not spatially correlated with the second given antenna port group, and a transmitting antenna or antenna group transmitting a radio signal on the second given antenna port group comprises at least one receiving antenna or antenna group transmitting a radio signal on the first given antenna port group.

In one embodiment, the first given antenna port group is not spatially correlated with the second given antenna port group, and a receiving antenna or antenna group transmitting a radio signal on the second given antenna port group comprises at least one transmitting antenna or antenna group transmitting a radio signal on the first given antenna port group.

In one embodiment, the first given antenna port group is not spatially correlated with the second given antenna port group; a second antenna group is one or more antenna groups that generate a multi-antenna relevant transmission or a multi-antenna relevant reception transmitting a radio signal on the second given antenna port group, and a first antenna group is one or more antenna groups that generate a multi-antenna relevant transmission or a multi-antenna relevant reception transmitting a radio signal on the first given antenna port group, the second antenna group comprising at least one antenna or antenna group in the first antenna group.

In one embodiment, the first given antenna port group is not spatially correlated with the second given antenna port group; a second antenna group is one or more antenna groups that generate a multi-antenna relevant transmission transmitting a radio signal on the second given antenna port group, and a first antenna group is one or more antenna groups that generate a multi-antenna relevant transmission transmitting a radio signal on the first given antenna port group, the second antenna group comprising at least one antenna or antenna group in the first antenna group.

In one embodiment, the first given antenna port group is not spatially correlated with the second given antenna port group; a second antenna group is one or more antenna groups that generate a multi-antenna relevant reception transmitting a radio signal on the second given antenna port group, and a first antenna group is one or more antenna groups that generate a multi-antenna relevant reception transmitting a radio signal on the first given antenna port group, the second antenna group comprising at least one antenna or antenna group in the first antenna group.

In one embodiment, the first given antenna port group is not spatially correlated with the second given antenna port group; a second antenna group is one or more antenna groups that generate a multi-antenna relevant transmission transmitting a radio signal on the second given antenna port group, and a first antenna group is one or more antenna groups that generate a multi-antenna relevant reception transmitting a radio signal on the first given antenna port group, the second antenna group comprising at least one antenna or antenna group in the first antenna group.

In one embodiment, the first given antenna port group is not spatially correlated with the second given antenna port group; a second antenna group is one or more antenna groups that generate a multi-antenna relevant reception transmitting a radio signal on the second given antenna port group, and a first antenna group is one or more antenna groups that generate a multi-antenna relevant transmission transmitting a radio signal on the first given antenna port group, the second antenna group comprising at least one antenna or antenna group in the first antenna group.

In one embodiment, the phrase that the first given antenna port group is not spatially correlated with the second given antenna port group refers to: any antenna port in the first given antenna port group and any antenna port in the second given antenna port group are not QCL.

In one embodiment, the phrase that the first given antenna port group is not spatially correlated with the second given antenna port group refers to: at least one antenna port in the first given antenna port group and any antenna port in the second given antenna port group are not QCL.

In one embodiment, the phrase that the first given antenna port group is not spatially correlated with the second given antenna port group refers to: any antenna port in the first given antenna port group and any antenna port in the second given antenna port group are not spatial QCL.

In one embodiment, the phrase that the first given antenna port group is not spatially correlated with the second given antenna port group refers to: at least one antenna port in the first given antenna port group and any antenna port in the second given antenna port group are not spatial QCL.

In one embodiment, the phrase that two antenna ports are not QCL refers to: all or part of large-scale properties of a radio signal transmitted by one of the two antenna ports cannot be inferred from all or part of large-scale properties of a radio signal transmitted by the other of the two antenna ports.

In one embodiment, the phrase that two antenna ports are not QCL refers to: each of the two antenna ports at least has a different QCL parameter, which comprises a multi-antenna relevant QCL parameter and a multi-antenna irrelevant QCL parameter.

In one embodiment, the phrase that two antenna ports are not QCL refers to: at least one QCL parameter of one of the two antenna ports cannot be inferred from that of the other of the two antenna port.

In one embodiment, the phrase that two antenna ports are not QCL refers to: a multi-antenna relevant reception of a radio signal transmitted on one of the two antenna ports cannot be inferred from a multi-antenna relevant reception of a radio signal transmitted on the other of the two antenna ports.

In one embodiment, the phrase that two antenna ports are not QCL refers to: a multi-antenna relevant transmission of a radio signal transmitted on one of the two antenna ports cannot be inferred from a multi-antenna relevant transmission of a radio signal transmitted on the other of the two antenna ports.

In one embodiment, the phrase that two antenna ports are not QCL refers to: a multi-antenna relevant transmission of a radio signal transmitted on one of the two antenna ports cannot be inferred from a multi-antenna relevant reception of a radio signal transmitted on the other of the two antenna ports, and a transmitter of the radio signal transmitted on one of the two antenna ports is the same as a receiver of the radio signal transmitted on the other of the two antenna ports.

In one embodiment, the phrase that two antenna ports are not spatial QCL refers to: all or part of multi-antenna relevant large-scale properties of a radio signal transmitted by one of the two antenna ports cannot be inferred from all or part of multi-antenna relevant large-scale properties of a radio signal transmitted by the other of the two antenna ports.

In one embodiment, the phrase that two antenna ports are not spatial QCL refers to: each of the two antenna ports at least has a different multi-antenna relevant spatial QCL parameter.

In one embodiment, the phrase that two antenna ports are not spatial QCL refers to: at least one multi-antenna relevant QCL parameter of one of the two antenna ports cannot be inferred from at least one multi-antenna relevant QCL parameter of the other of the two antenna ports.

In one embodiment, the phrase that two antenna ports are not spatial QCL refers to: a multi-antenna relevant reception of a radio signal transmitted on one of the two antenna ports cannot be inferred from that transmitted on the other of the two antenna ports.

In one embodiment, the phrase that two antenna ports are not spatial QCL refers to: a multi-antenna relevant transmission of a radio signal transmitted on one of the two antenna ports cannot be inferred from a multi-antenna relevant transmission of a radio signal transmitted on the other of the two antenna ports.

In one embodiment, the phrase that two antenna ports are not spatial QCL refers to: a multi-antenna relevant transmission of a radio signal transmitted on one of the two antenna ports cannot be inferred from a multi-antenna relevant reception of a radio signal transmitted on the other of the two antenna ports, and a transmitter of the radio signal transmitted on one of the two antenna ports is the same as a receiver of the radio signal transmitted on the other of the two antenna ports.

In one embodiment, the Embodiment 9A corresponds to a schematic diagram of the first given antenna port group being not spatially correlated with the second given antenna port group wherein a transmitting beam of the first given antenna port group is different from a transmitting beam of the second given antenna port group.

In one embodiment, the Embodiment 9B corresponds to a schematic diagram of the first given antenna port group being spatially correlated with the second given antenna port group wherein a transmitting beam of the second given antenna port group only comprises part of a transmitting beam of the first given antenna port group.

Embodiment 10

Figure 10:
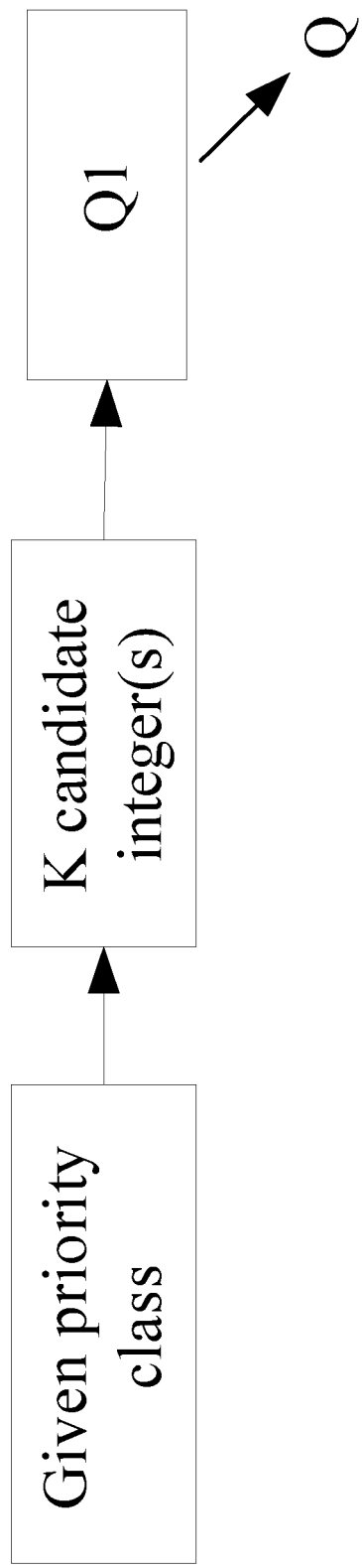
FIG. 10 illustrates a schematic diagram illustrating a given priority class being used to determine Q according to one embodiment of the present disclosure.
Figure 11A:
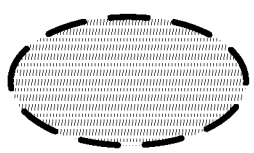
FIG. 11A-11B respectively illustrate a schematic diagram of a given antenna port being spatially correlated with a given energy detection according to one embodiment of the present disclosure.
Figure 11A:
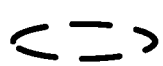
Figure 11B:
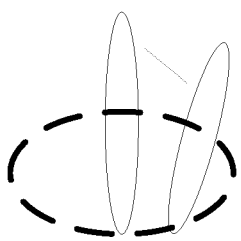
Figure 11B:
Figure 11B:
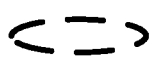

Embodiment 10 illustrates a schematic diagram of a given priority class being used for determining Q, as shown in FIG. 10.

In Embodiment 10, the given priority class is used for determining K candidate integer(s), and a first counter is set to be equal to Q1 in step S1005 in Embodiment 7, the Q1 being a candidate integer among the K candidate integer(s). The given priority class corresponds to the first priority class, or the second priority class in the present disclosure; the Q corresponds to the G in the present disclosure;

In one embodiment, the UE randomly selects a value of the Q1 from the K candidate integer(s).

In one embodiment, the probability that the UE selects any of the K candidate integer(s) as a value of the Q1 is equal.

In one embodiment, the given priority class corresponds to a value set, and the K is a value in value set.

In one subembodiment of the above embodiment, the given priority class and a correspondence of the value set are pre-defined.

In one subembodiment of the above embodiment, the given priority class and a correspondence of the value set are configured by a higher-layer signaling.

In one subembodiment of the above embodiment, a correspondence of the value set is pre-defined.

In one subembodiment of the above embodiment, a correspondence of the value set is configured by a higher-layer signaling.

In one subembodiment of the above embodiment, the value set includes 3,7,15,31,63, 127, 255, 511 and 1023.

In one embodiment, the K candidate integer(s) is(are) 0,1, 2, . . . , K−1.

In one embodiment, the K is a CWp, the CWp being the size of a contention window, and the specific meaning of the CWp can be found in 3GPP TS36. 213, chapter 15.

In one embodiment, any of the K candidate integer(s) is a non-negative integer.

In one embodiment, the K candidate integer(s) includes 0.

In one embodiment, any two of the K candidate integers are unequal.

In one embodiment, the K is a positive integer greater than 1.

Embodiment 11

Embodiment 11A to Embodiment 11B respectively illustrate schematic diagrams of a given antenna port being spatially correlated with a given energy detection.

In Embodiment 11, the given energy detection corresponds to any of the G energy detection(s) in the present disclosure, and the given antenna port corresponds to the second antenna port group or one antenna port in the second antenna port group in the present disclosure; the given energy detection corresponds to any of the P energy detection(s) in the present disclosure, and the given antenna port corresponds to one antenna port in the second antenna port group in the present disclosure.

In one embodiment, a given antenna port and a given energy detection being spatially correlated refers to: a multi-antenna relevant reception used by the given energy detection can be used for inferring a multi-antenna relevant transmission of the given antenna port, or a multi-antenna relevant transmission of the given antenna port can be used for inferring a multi-antenna relevant reception used by the given energy detection.

In one embodiment, a given antenna port and a given energy detection being spatially correlated refers to: a multi-antenna relevant reception used by the given energy detection is the same as a multi-antenna relevant transmission of the given antenna port.

In one embodiment, a given antenna port and a given energy detection being spatially correlated refers to: a multi-antenna relevant reception used by the given energy detection comprises a multi-antenna relevant transmission of the given antenna port.

In one embodiment, a given antenna port and a given energy detection being spatially correlated refers to: a beam width corresponding to a receiving beamforming matrix used by the given energy detection is not less than a beam width corresponding to a transmitting beamforming matrix of the given antenna port.

In one embodiment, a given antenna port and a given energy detection being spatially correlated refers to: a beam direction corresponding to a receiving beamforming matrix used by the given energy detection comprises a beam direction corresponding to a transmitting beamforming matrix of the given antenna port.

In one embodiment, a given antenna port and a given energy detection being spatially correlated refers to: a beam width corresponding to a receiving beam used by the given energy detection is greater than a beam width corresponding to a transmitting beam of the given antenna port.

In one embodiment, a given antenna port and a given energy detection being spatially correlated refers to: a receiving beam used by the given energy detection comprises a transmitting beam of the given antenna port.

In one embodiment, a given antenna port and a given energy detection being not spatially correlated refers to: a multi-antenna relevant reception used by the given energy detection cannot be used for inferring a multi-antenna relevant transmission of the given antenna port, or a multi-antenna relevant transmission of the given antenna port cannot be used for inferring a multi-antenna relevant reception used by the given energy detection.

In one embodiment, a given antenna port and a given energy detection being not spatially correlated refers to: a multi-antenna relevant reception used by the given energy detection is different from a multi-antenna relevant transmission of the given antenna port.

In one embodiment, a given antenna port and a given energy detection being not spatially correlated refers to: a multi-antenna relevant reception used by the given energy detection does not comprise a multi-antenna relevant transmission of a given antenna port.

In one embodiment, a given antenna port and a given energy detection being not spatially correlated refers to: a beam width corresponding to a receiving beamforming matrix used by the given energy detection is less than a beam width corresponding to a transmitting beamforming matrix of the given antenna port.

In one embodiment, a given antenna port and a given energy detection being not spatially correlated refers to: a beam direction corresponding to a receiving beamforming matrix used by the given energy detection does not comprise a beam direction corresponding to a transmitting beamforming matrix of the given antenna port.

In one embodiment, a given antenna port and a given energy detection being not spatially correlated refers to: a beam width corresponding to a receiving beam used by the given energy detection is less than a beam width corresponding to a transmitting beam of the given antenna port.

In one embodiment, a given antenna port and a given energy detection being not spatially correlated refers to: a receiving beam used by the given energy detection does not comprise a transmitting beam of the given antenna port.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception refers to receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission refers to a transmitting spatial filtering.

In one embodiment, the Spatial Tx parameters include one or more of a transmitting antenna port, a transmitting antenna port set, a transmitting beam, a transmitting analog beamforming matrix, a transmitting analog beamforming vector, a transmitting beamforming matrix, a transmitting beamforming vector and transmitting spatial filtering.

In one embodiment, the Spatial Tx parameters comprise a transmitting antenna port.

In one embodiment, the Spatial Tx parameters comprise a transmitting antenna port group.

In one embodiment, the Spatial Tx parameters comprise a transmitting beam.

In one embodiment, the Spatial Tx parameters comprise a transmitting analog beamforming matrix.

In one embodiment, the Spatial Tx parameters comprise a transmitting analog beamforming vector.

In one embodiment, the Spatial Tx parameters comprise a transmitting beamforming matrix.

In one embodiment, the Spatial Tx parameters comprise a transmitting beamforming vector.

In one embodiment, the Spatial Tx parameters comprise a transmitting antenna port and a transmitting beam.

In one embodiment, the Spatial Tx parameters comprise a transmitting antenna port and a transmitting analog beamforming matrix.

In one embodiment, the Spatial Tx parameters comprise a transmitting antenna port and a transmitting analog beamforming vector.

In one embodiment, the Spatial Tx parameters comprise a transmitting antenna port and a transmitting beamforming matrix.

In one embodiment, the Spatial Tx parameters comprise a transmitting antenna port and a transmitting beamforming vector.

In one embodiment, the Spatial Tx parameters comprise a transmitting antenna port group and a transmitting beam.

In one embodiment, the Spatial Tx parameters comprise a transmitting antenna port group and a transmitting analog beamforming matrix.

In one embodiment, the Spatial Tx parameters comprise a transmitting antenna port group and a transmitting analog beamforming vector.

In one embodiment, the Spatial Tx parameters comprise a transmitting antenna port group and a transmitting beamforming matrix.

In one embodiment, the Spatial Tx parameters comprise a transmitting antenna port group and a transmitting beamforming vector.

In one embodiment, Spatial Rx parameters includes one or more of a receiving beam, a receiving analog beamforming matrix, a receiving analog beamforming vector, a receiving beamforming matrix, a receiving beamforming vector and receiving spatial filtering.

In one embodiment, the Spatial Rx parameters comprise a receiving beam.

In one embodiment, the Spatial Rx parameters comprise a receiving analog beamforming matrix.

In one embodiment, the Spatial Rx parameters comprise a receiving analog beamforming vector.

In one embodiment, the Spatial Rx parameters comprise a receiving beamforming matrix.

In one embodiment, the Spatial Rx parameters comprise a receiving beamforming vector.

In one embodiment, the Spatial Rx parameters comprise receiving spatial filtering.

In one embodiment, a number of antennas used by the given energy detection is less than a number of transmitting antennas of the given antenna port.

In one embodiment, a number of antennas used by the given energy detection is greater than 1.

In one embodiment, a number of transmitting antennas of the given antenna port is greater than 1.

In one embodiment, the Embodiment 11A corresponds to a schematic diagram of the given antenna port being spatially correlated with the given energy detection wherein a receiving beam used by the given energy detection is the same with a transmitting beam used by the given antenna port.

In one embodiment, the Embodiment 11B corresponds to a schematic diagram of the given antenna port being spatially correlated with the given energy detection wherein a receiving beam used by the given energy detection comprises a transmitting beam of the given antenna port.

Embodiment 12

Figure 12:
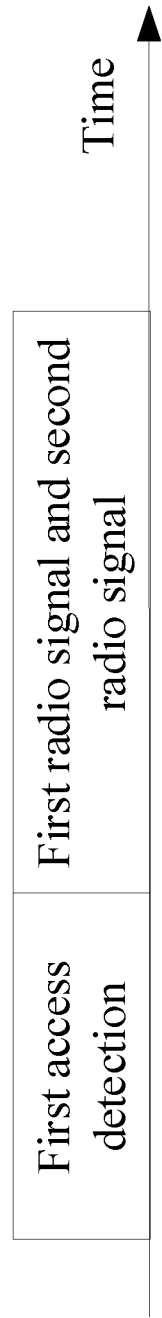
FIG. 12 illustrates a schematic diagram of relationships among a first access detection, a first radio signal and a second radio signal according to one embodiment of the present disclosure.

Embodiment 12 illustrates a schematic diagram of relationships among a first access detection, a first radio signal and a second radio signal, as shown in FIG. 12.

In Embodiment 12, the first access detection in the present disclosure comprises: performing the G energy detection(s) respectively in the G time sub-pool(s) on the first sub-band in the present disclosure to obtain the G detection value(s) in the present disclosure, the G being a positive integer. The first antenna port group in the present disclosure is spatially correlated with the second antenna port group in the present disclosure, and the first priority class in the present disclosure is not greater than the second priority class in the present disclosure, the second priority class being used for determining the G, the G energy detection(s) being correlated with the second antenna port group.

In Embodiment 12, the second information in the present disclosure indicates configuration information of the second radio signal, the second radio signal is correlated with the second antenna port group, and whether the second radio signal is transmitted at the second time in the present disclosure is related to whether the first antenna port group is spatially correlated with the second antenna port group.

In one embodiment, both the first radio signal and the second radio signal are transmitted, or neither is transmitted.

In one embodiment, the G energy detection(s) being correlated with the second antenna port group refers to: any antenna port in the second antenna port group is spatially correlated with any of the G time(s) energy detection.

In one embodiment, the G energy detection(s) being correlated with the second antenna port group refers to: at least one antenna port in the second antenna port group is spatially correlated with any of the G time(s) energy detection.

In one embodiment, the G energy detection(s) being correlated with the second antenna port group refers to: an antenna port in the second antenna port group is spatially correlated with any of the G time(s) energy detection.

In one embodiment, the first antenna port is spatially correlated with the second antenna port group, the first priority class is not greater than the second priority class, and the second time is after an end time of the first access detection.

In one embodiment, the first antenna port is spatially correlated with the second antenna port group, the first priority class is not greater than the second priority class, and a transmission time of the second radio signal is after an end time of the first access detection.

In one embodiment, the first antenna port group is spatially correlated with the second antenna port group, the first priority class is not greater than the second priority class, and the first access detection is used for determining whether to transmit the second radio signal at the second time.

In one embodiment, the first antenna port group is spatially correlated with the second antenna port group, the first priority class is not greater than the second priority class, and the G energy detection(s) is(are) used for determining whether the second radio signal is transmitted at the second time.

In one embodiment, the first antenna port is spatially correlated with the second antenna port group, the first priority class is not greater than the second priority class, and the second time is after an end time of the G energy detection(s).

In one embodiment, the first antenna port group is spatially correlated with the second antenna port group, the first priority class is not greater than the second priority class, and a start time of the first access detection is before a reception time of the first information.

In one embodiment, the first antenna port group is spatially correlated with the second antenna port group, the first priority class is not greater than the second priority class, and a start time of the first access detection is after a reception time of the first information.

In one embodiment, the first antenna port group is spatially correlated with the second antenna port group, the first priority class is not greater than the second priority class, and a start time of the first access detection is after a reception time of the second information.

In one embodiment, the first antenna port group is spatially correlated with the second antenna port group, the first priority class is not greater than the second priority class, and a start time of the G energy detection(s) is before a reception time of the first information.

In one embodiment, the first antenna port group is spatially correlated with the second antenna port group, the first priority class is not greater than the second priority class, and a start time of the G energy detection(s) is after a reception time of the first information.

In one embodiment, the first antenna port group is spatially correlated with the second antenna port group, the first priority class is not greater than the second priority class, and a start time of the G energy detection(s) is after a reception time of the second information.

In one embodiment, the first antenna port group is spatially correlated with the second antenna port group, the first priority class is not greater than the second priority class, and a transmission time of the second radio signal is before a transmission time of the first radio signal.

Embodiment 13

Figure 13A:
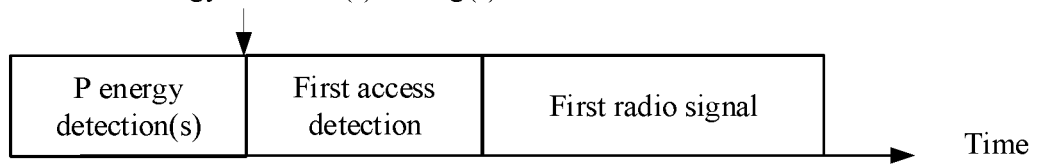
FIG. 13A-13B respectively illustrate relationships among a first access detection, P energy detection(s), a first radio signal and a second radio signal according to one embodiment of the present disclosure.
Figure 13B:
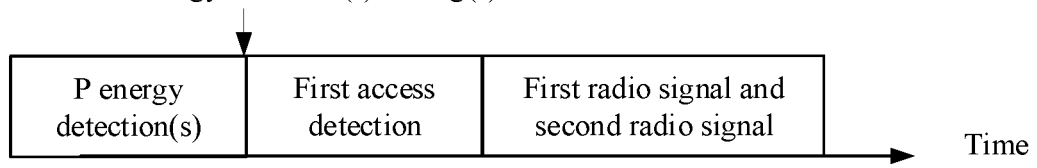

Embodiment 13A to Embodiment 13B respectively illustrate schematic diagrams of relationships among a first access detection, P energy detection(s), a first radio signal and a second radio signal, as shown in FIG. 13.

In Embodiment 13, the first access detection in the present disclosure comprises: performing the G energy detection(s) respectively in the G time sub-pool(s) on the first sub-band in the present disclosure to obtain the G detection value(s) in the present disclosure, the G being a positive integer. The first antenna port group in the present disclosure is spatially correlated with the second antenna port group in the present disclosure, and the first priority class in the present disclosure is greater than the second priority class in the present disclosure, the first priority class being used for determining the G, the G energy detection(s) being correlated with the first antenna port group.

In Embodiment 13, the second information in the present disclosure indicates configuration information of the second radio signal, the second radio signal is correlated with the second antenna port group, and whether the second radio signal is transmitted at the second time in the present disclosure is related to whether the first antenna port group is spatially correlated with the second antenna port group.

In one embodiment, the G energy detection(s) being correlated with the first antenna port group refers to: any antenna port in the first antenna port group is spatially correlated with any of the G energy detection(s).

In one embodiment, the phrase that the G energy detection(s) is(are) correlated with the first antenna port group refers to: at least one antenna port in the first antenna port group is spatially correlated with any of the G energy detection(s).

In one embodiment, the phrase that the G energy detection(s) is(are) correlated with the first antenna port group refers to: an antenna port in the first antenna port group is spatially correlated with any of the G energy detection(s).

In one embodiment, the first antenna port group is spatially correlated with the second antenna port group, the first priority class is greater than the second priority class, and the G is irrelevant with the P.

In one embodiment, the first antenna port group is spatially correlated with the second antenna port group, the first priority class is greater than the second priority class, and an end time of the P time sun-pool(s) is before a transmission time of the first radio signal.

In one embodiment, the first antenna port group is spatially correlated with the second antenna port group, the first priority class is greater than the second priority class, and an end time of the P time sun-pool(s) is before a start time of the first time window.

In one embodiment, the first antenna port group is spatially correlated with the second antenna port group, the first priority class is greater than the second priority class, and an end time of the P time sun-pool(s) is before a start time of the first access detection.

In one embodiment, the first antenna port group is spatially correlated with the second antenna port group, the first priority class is greater than the second priority class, and an end time of the P time sun-pool(s) is before a start time of the G time sub-pool(s).

In one embodiment, the first antenna port group is spatially correlated with the second antenna port group, the first priority class is greater than the second priority class, as well as the P time sub-pool(s) and the G time sub-pool(s) are orthogonal in time domain.

In one embodiment, the first antenna port group is spatially correlated with the second antenna port group, the first priority class is greater than the second priority class, and the P time sub-pool(s) belong(s) to an ongoing access detection.

In one subembodiment of the above embodiment, at an end time of the P time sub-pool(s), a counter's value of the ongoing access detection is >0.

In one subembodiment of the above embodiment, the P time sub-pool(s) belong(s) to a monitoring time in CAT 4 LBT.

In one subembodiment of the above embodiment, the P time sub-pool(s) comprise(s) previous part of a monitoring time in CAT 4 LBT.

In one subembodiment of embodiment, the P time sub-pool(s) comprises a slot duration in a Defer duration and part of slot durations in a Backoff Time in Cat 4 LBT.

In one subembodiment of embodiment, the P time sub-pool(s) comprises a slot duration in a Defer duration and previous part of slot durations in a Backoff Time in Cat 4 LBT.

In one subembodiment of the above embodiment, the P time sub-pool(s) comprises a slot duration in a Defer duration and part of slot durations in a Backoff Time in Type 1 UL channel access procedure.

In one subembodiment of the above embodiment, the P time sub-pool(s) comprises a slot duration in a Defer duration and previous part of slot durations in a Backoff Time in Type 1 UL channel access procedure.

In one subembodiment of the above embodiment, the P time sub-pool(s) belong(s) to slot durations in an initial CCA and an Enhanced Clear Channel Assessment (eCCA).

In one subembodiment of the above embodiment, the P time sub-pool(s) comprise(s) part of slot durations in an initial CCA and an eCCA.

In one subembodiment of the above embodiment, the P time sub-pool(s) comprise(s) previous part of slot durations in an initial CCA and an eCCA.

In one embodiment, the first antenna port group is spatially correlated with the second antenna port group, the first priority class is greater than the second priority class, and the transmission of the second radio signal is dropped at the second time.

In one embodiment, the first antenna port group is spatially correlated with the second antenna port group, the first priority class is greater than the second priority class, and the first access detection is used for determining whether the second radio signal is transmitted at the second time.

In one subembodiment of the above embodiment, a transmission time of the second radio signal is after an end time of the first access detection.

In one embodiment, a start time of the first access detection is after a reception time of the first information.

In one embodiment, the Embodiment 13A corresponds to a schematic diagram of relationships among a first access detection, P energy detection(s), a first radio signal and a second radio signal wherein the transmission of the second radio signal is dropped at the second time.

In one embodiment, the Embodiment 13B corresponds to a schematic diagram of relationships among a first access detection, P energy detection(s), a first radio signal and a second radio signal wherein the first access detection is used for determining whether the second radio signal is transmitted at the second time.

Embodiment 14

Figure 14A:
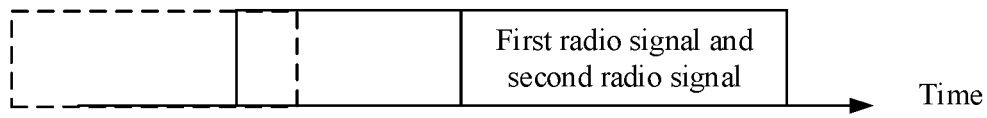
FIG. 14A-14B respectively illustrate relationships among a first access detection, P energy detection(s), a first radio signal and a second radio signal according to another embodiment of the present disclosure.
Figure 14B:
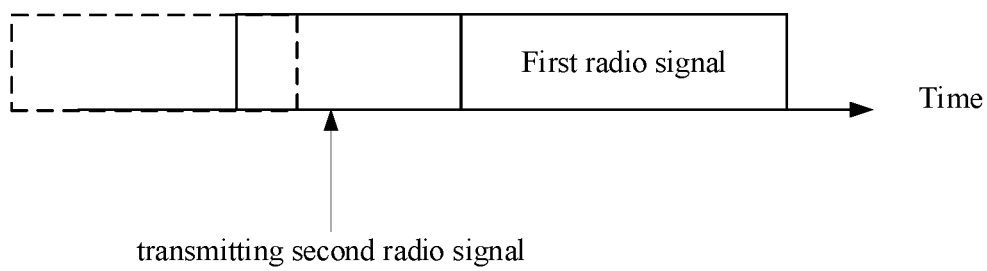

Each of Embodiment 14A to Embodiment 14B respectively illustrates another schematic diagram of relationships among first access detection, P energy detection(s), a first radio signal and a second radio signal, as shown in FIG. 14.

In Embodiment 14, the first access detection in the present disclosure comprises: performing the G energy detection(s) respectively in the G time sub-pool(s) on the first sub-band in the present disclosure to obtain the G detection value(s) in the present disclosure, the G being a positive integer. The first antenna port group in the present disclosure is not spatially correlated with the second antenna port group in the present disclosure, the first priority class in the present disclosure is used for determining the G, and the G energy detection(s) being correlated with the first antenna port group in the present disclosure.

In Embodiment 14, the second information in the present disclosure indicates configuration information of the second radio signal, the second radio signal is correlated with the second antenna port group, and whether the second radio signal is transmitted at the second time in the present disclosure is related to whether the first antenna port group is spatially correlated with the second antenna port group.

In one embodiment, the phrase that the first given antenna port group is not spatially correlated with the second given antenna port group refers to: all antenna ports in the second given antenna port group and all antenna ports in the first given antenna port group can transmit radio signals simultaneously.

In one embodiment, the phrase that the first given antenna port group is not spatially correlated with the second given antenna port group refers to: a radio signal transmitted on any antenna port in the second given antenna port group and a radio signal transmitted on any antenna port in the first given antenna port group can be received simultaneously.

In one embodiment, the phrase that the first given antenna port group is not spatially correlated with the second given antenna port group refers to: being able to transmit a radio signal on any antenna port in the second given antenna port group and receive a radio signal transmitted on any antenna port in the first given antenna port group simultaneously.

In one embodiment, the phrase that the first given antenna port group is not spatially correlated with the second given antenna port group refers to: being able to transmit a radio signal on any antenna port in the first given antenna port group and receive a radio signal transmitted on any antenna port in the second given antenna port group simultaneously.

In one embodiment, the phrase that the first given antenna port group is not spatially correlated with the second given antenna port group refers to: being able to transmit or receive a radio signal simultaneously on any antenna port in the first given antenna port group and transmit or receive simultaneously a radio signal transmitted on any antenna port in the second given antenna port group.

In one embodiment, a transmitting or receiving antenna or antenna group transmitting a radio signal on any antenna port in the second antenna port group and a transmitting or receiving antenna or antenna group transmitting a radio signal on any antenna port in the first antenna port group do not comprise a same antenna or antenna group.

In one embodiment, an antenna or antenna group transmitting a radio signal on any antenna port in the second antenna port group and an antenna or antenna group transmitting a radio signal on any antenna port in the first antenna port group do not comprise a same antenna or antenna group.

In one embodiment, a receiving antenna or antenna group transmitting a radio signal on any antenna port in the second antenna port group and a receiving antenna or antenna group transmitting a radio signal on any antenna port in the first antenna port group do not comprise a same antenna or antenna group.

In one embodiment, an antenna or antenna group transmitting a radio signal on any antenna port in the second antenna port group and a receiving antenna or antenna group transmitting a radio signal on any antenna port in the first antenna port group do not comprise a same antenna or antenna group.

In one embodiment, an antenna or antenna group transmitting a radio signal on any antenna port in the first antenna port group and a receiving antenna or antenna group transmitting a radio signal on any antenna port in the second antenna port group do not comprise a same antenna or antenna group.

In one embodiment, a second antenna group is one or more antenna groups that generate a multi-antenna relevant transmission or a multi-antenna relevant reception transmitting a radio signal on any antenna port in the second antenna port group; a first antenna group is one or more antenna groups that generate a multi-antenna relevant transmission or a multi-antenna relevant reception of any antenna port in the first antenna port group; and the first antenna group and the second antenna group do not comprise a same antenna or antenna group.

In one embodiment, a second antenna group is one or more antenna groups that generate a multi-antenna relevant transmission transmitting a radio signal on any antenna port in the second antenna port group; a first antenna group is one or more antenna groups that generate a multi-antenna relevant transmission of any antenna port in the first antenna port group; the first antenna group and the second antenna group do not comprise a same antenna or antenna group.

In one embodiment, a second antenna group is one or more antenna groups that generate a multi-antenna relevant reception transmitting a radio signal on any antenna port of the second antenna port group; a first antenna group is one or more antenna groups that generate a multi-antenna relevant reception of any antenna port in the first antenna port group; the first antenna group and the second antenna group do not comprise a same antenna or antenna group.

In one embodiment, a second antenna group is one or more antenna groups that generate a multi-antenna relevant transmission transmitting a radio signal on any antenna port in the second antenna port group; a first antenna group is one or more antenna groups that generate a multi-antenna relevant reception of any antenna port in the first antenna port group; the first antenna group and the second antenna group do not comprise a same antenna or antenna group.

In one embodiment, a second antenna group is one or more antenna groups that generate a multi-antenna relevant reception transmitting a radio signal on any antenna port of the second antenna port group; a first antenna group is one or more antenna groups that generate a multi-antenna relevant transmission of any antenna port of the first antenna port group; the first antenna group and the second antenna group do not comprise a same antenna or antenna group.

In one embodiment, an end time of the P time sub-pool(s) is irrelevant with a transmission time of the first radio signal.

In one embodiment, an end time of the P time sub-pool(s) is irrelevant with a start time of the first time window.

In one embodiment, an end time of the P time sub-pool(s) is irrelevant with a start time of the G time sub-pool(s).

In one embodiment, at an end time of the P time sub-pool(s), an access detection corresponding to the P energy detection(s) ends.

In one embodiment, the P time sub-pool(s) overlap(s) with the first access detection in time domain.

In one embodiment, the P time sub-pool(s) and the first access detection can be performed simultaneously.

In one embodiment, the P energy detection(s) is(are) used for determining whether the second radio signal is transmitted at the second time.

In one embodiment, multi-antenna relevant receptions respectively used by the P times of energy detection are the same.

In one embodiment, the P energy detection(s) is(are) used to determine whether the first sub-band is idle.

In one embodiment, the P energy detection(s) is used for determining whether the first sub-band can be used by the UE for transmitting the second radio signal.

In one embodiment, the P energy detection(s) is(are) energy detection(s) in LBT, and the specific meaning and implementation method of the LBT can be found in 3GPP TR36. 889.

In one embodiment, the P energy detection(s) is(are) energy detection(s) in Clear Channel Assessment (CCA), and the specific meaning and implementation method of the CCA can be found in 3GPP TR36. 889.

In one embodiment, any of the P energy detection(s) is implemented in the way defined in 3GPP TS36. 213, chapter 15.

In one embodiment, any of the P energy detection(s) is implemented in the way of energy detection in WiFi.

In one embodiment, any of the P energy detection(s) is implemented in the way of performing a measurement on a Received Signal Strength Indication (RSSI).

In one embodiment, any of the P energy detection(s) is implemented in the way of energy detection in LTE LAA.

In one embodiment, time-domain resources occupied by any of the P sub-pool(s) are consecutive.

In one embodiment, each two of the P time sub-pools are orthogonal (not overlapping) in time domain.

In one embodiment, duration of any of the P time sub-pool(s) is one of 16 microsecond or 9 microseconds.

In one embodiment, there exists durations of at least two of the P time sub-pools being not equal.

In one embodiment, durations of any two of the P time sub-pools being equal.

In one embodiment, time-domain resources occupied by the P sub-pool(s) are consecutive.

In one embodiment, there exists time-domain resources of at least two of the P time sub-pools being not consecutive.

In one embodiment, time-domain resources of any two of the P time sub-pools being not consecutive.

In one embodiment, any of the P time sub-pool(s) is a slot duration.

In one embodiment, any of the P time sub-pool(s) is a Tsl, the Tsl being a slot duration, and the specific meaning of the Tsl can be found in 3GPP TS36. 213, chapter. 15.

In one embodiment, any time sub-pool other than an earliest one among the P time sub-pools is a slot duration.

In one embodiment, any time sub-pool other than an earliest one among the P time sub-pools is a Tsl, the Tsl being a slot duration, and the specific meaning of the Tsl can be found in 3GPP TS36. 213, chapter. 15.

In one embodiment, there exists at least one time sub-pool with duration of 16 microseconds among the P time sub-pool(s).

In one embodiment, there exists at least one time sub-pool with duration of 9 microseconds among the P time sub-pool(s).

In one embodiment, duration of an earliest one among the P time sub-pool(s) is 16 microseconds.

In one embodiment, duration of a latest one among the P time sub-pool(s) is 9 microseconds.

In one embodiment, the P time sub-pool(s) comprises a monitoring time in CAT 4 LBT.

In one embodiment, the P time sub-pool(s) comprises a slot duration in a Defer duration and a slot duration in a Backoff Time in Cat 4 LBT.

In one embodiment, the P time sub-pool(s) comprises a slot duration in a Defer duration and a slot duration in a Backoff Time in Type 1 UL channel access procedure.

In one embodiment, the P time sub-pool(s) comprises a slot duration in an initial CCA and an eCCA.

In one embodiment, the P detection value(s) is(are) respectively obtained by the P energy detection(s).

In one embodiment, the P detection value(s) is(are) respectively the received power that the UE senses the power of all radio signals on the first sub-band in P time unit(s) and averages it in time to obtain; the P time unit(s) is(are) respectively duration in the P time sub-pool(s).

In one subembodiment of the above embodiment, duration of any of the P time unit(s) is not less than 4 microseconds.

In one embodiment, the P detection value(s) is(are) respectively the received energy that the UE senses the energy of all radio signals on the first sub-band in P time unit(s) and averages it in time to obtain; the P time unit(s) is(are) respectively duration in the P time sub-pool(s).

In one subembodiment of the above embodiment, duration of any of the P time unit(s) is not less than 4 microseconds.

In one embodiment, the phrase that any given energy detection of the P energy detection(s) refers to: the UE monitors the received power in a given time unit, the given time unit being duration in a time sub-pool corresponding to the given energy detection among the P time sub-pool(s).

In one embodiment, the phrase that any given energy detection of the P energy detection(s) refers to: the UE monitors the received energy in a given time unit, the given time unit being duration in a time sub-pool corresponding to the given energy detection among the P time sub-pool(s).

In one embodiment, the Embodiment 14A corresponds to a schematic diagram of relationships among the first access detection, the P energy detection(s), the first radio signal and the second radio signal wherein the P time sub-pool(s) overlap(s) with the first access detection in time domain, and transmission times of the first radio signal and the second radio signal are after an end time of the first access detection.

In one embodiment, the Embodiment 14B corresponds to a schematic diagram of relationships among the first access detection, the P energy detection(s), the first radio signal and the second radio signal wherein the P time sub-pool(s) overlap(s) with the first access detection in time domain and a transmission time of the first radio signal is before an end time of the first access detection.

Embodiment 15

Figure 15:
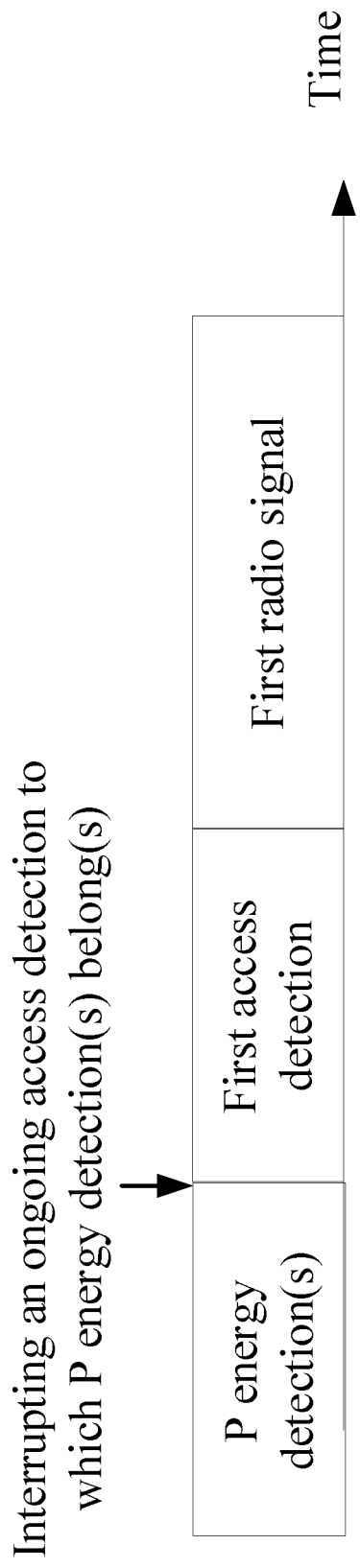
FIG. 15 illustrates relationships among a first access detection, P energy detection(s), a first radio signal and a second radio signal according to another embodiment of the present disclosure.

Embodiment 15 illustrates another schematic diagram of the relationships among a first access detection, P energy detection(s), a first radio signal and a second radio signal, as shown in FIG. 15.

In Embodiment 15, the first access detection in the present disclosure comprises: performing the G energy detection(s) respectively in the G time sub-pool(s) on the first sub-band in the present disclosure to obtain the G detection value(s) in the present disclosure, the G being a positive integer. The first antenna port group in the present disclosure is not spatially correlated with the second antenna port group in the present disclosure, the first priority class in the present disclosure is used for determining the G, and the G energy detection(s) is(are) correlated with the first antenna port group.

In Embodiment 15, the second information in the present disclosure indicates configuration information of the second radio signal, the second radio signal is correlated with the second antenna port group, and whether the second radio signal is transmitted at the second time in the present disclosure is related to whether the first antenna port group is spatially correlated with the second antenna port group.

In one embodiment, at least one antenna port in the first antenna port group and at least one antenna port in the second given antenna port group cannot transmit radio signals simultaneously.

In one embodiment, a transmission or reception of a radio signal on at least one antenna port of the first antenna port group and a transmission or reception of a radio signal on at least one antenna port of the second antenna port group cannot be performed simultaneously.

In one embodiment, a reception transmitting a radio signal on at least one antenna port in the first antenna port group and a reception transmitting a radio signal on at least one antenna port in the second antenna port group cannot be performed simultaneously.

In one embodiment, a transmission of a radio signal on at least one antenna port in the first antenna port group and a reception transmitting a radio signal on at least one antenna port in the second antenna port group cannot be performed simultaneously.

In one embodiment, a transmission of a radio signal on at least one antenna port of the second antenna port group and a reception transmitting a radio signal on at least one antenna port of the first antenna port group cannot be performed simultaneously.

In one embodiment, any antenna port in the first antenna port group and at least one antenna port in the second given antenna port group cannot transmit radio signals simultaneously.

In one embodiment, a transmission or reception of a radio signal on any antenna port in the first antenna port group and a transmission or reception of a radio signal on at least one antenna port in the second antenna port group cannot be performed simultaneously.

In one embodiment, a reception transmitting a radio signal on any antenna port of the first antenna port group and a reception transmitting a radio signal on at least one antenna port of the second antenna port group cannot be performed simultaneously.

In one embodiment, a transmission of a radio signal on any antenna port of the first antenna port group and a reception transmitting a radio signal on at least one antenna port of the second antenna port group cannot be performed simultaneously.

In one embodiment, a transmission of a radio signal on at least one antenna port in the second antenna port group and a reception transmitting a radio signal on any antenna port in the first antenna port group cannot be performed simultaneously.

In one embodiment, a transmitting or receiving antenna or antenna group transmitting a radio signal on the second antenna port group comprises at least one transmitting or receiving antenna or antenna group transmitting a radio signal on the first antenna port group.

In one embodiment, a transmitting antenna or antenna group of a radio signal on the second antenna port group comprises at least one transmitting antenna or antenna group of a radio signal on the first antenna port group.

In one embodiment, a receiving antenna or antenna group transmitting a radio signal on the second antenna port group comprises at least one receiving antenna or antenna group transmitting a radio signal on the first antenna port group.

In one embodiment, a transmitting antenna or antenna group transmitting a radio signal on the second antenna port group comprises at least one receiving antenna or antenna group transmitting a radio signal on the first antenna port group.

In one embodiment, a receiving antenna or antenna group transmitting a radio signal on the second antenna port group comprises at least one transmitting antenna or antenna group transmitting a radio signal on the first antenna port group.

In one embodiment, a second antenna group is one or more antenna groups that generate a multi-antenna relevant transmission or a multi-antenna relevant reception transmitting a radio signal on the second antenna port group; a first antenna group is one or more antenna groups that generate a multi-antenna relevant transmission or a multi-antenna relevant reception transmitting a radio signal on the first antenna port group; and the second antenna group comprises at least one antenna or antenna group in the first antenna group.

In one embodiment, a second antenna group is one or more antenna groups that generate a multi-antenna relevant transmission transmitting a radio signal on the second antenna port group; a first antenna group is one or more antenna groups that generate a multi-antenna relevant transmission transmitting a radio signal on the first antenna port group; the second antenna group comprises at least one antenna or antenna group of the first antenna group.

In one embodiment, a second antenna group is one or more antenna groups that generate a multi-antenna relevant reception transmitting a radio signal on the second antenna port group; a first antenna group is one or more antenna groups that generate a multi-antenna relevant reception transmitting a radio signal on the first antenna port group; the second antenna group comprises at least one antenna or antenna group of the first antenna group.

In one embodiment, a second antenna group is one or more antenna groups that generate a multi-antenna relevant transmission transmitting a radio signal on the second antenna port group; a first antenna group is one or more antenna groups that generate a multi-antenna relevant reception transmitting a radio signal on the first antenna port group; the second antenna group comprises at least one antenna or antenna group of the first antenna group.

In one embodiment, a second antenna group is one or more antenna groups that generate a multi-antenna relevant reception transmitting a radio signal on the second antenna port group; a first antenna group is one or more antenna groups that generate a multi-antenna relevant transmission transmitting a radio signal on the first antenna port group; the second antenna group comprises at least one antenna or antenna group of the first antenna group.

In one embodiment, an end time of the P time sub-pool(s) is before a transmission time of the first radio signal.

In one embodiment, an end time of the P time sub-pool(s) is before a start time of the first time window.

In one embodiment, an end time of the P time sub-pool(s) is before a start time of the G time sub-pool(s).

In one embodiment, the P time sub-pool(s) and the G time sub-pool(s) are orthogonal in time domain.

In one embodiment, the P time sub-pool(s) belong(s) to an ongoing access detection.

In one subembodiment of the above embodiment, at an end time of the P time sub-pool(s), a counter's value of the ongoing access detection is >0.

In one embodiment, a transmission of the second radio signal at the second time is dropped.

In one embodiment, the first access detection and the P energy detection(s) cannot be performed simultaneously.

In one embodiment, the P time sub-pool(s) belong(s) to a monitoring time in CAT 4 LBT.

In one embodiment, the P time sub-pool(s) comprise(s) previous part of a monitoring time in CAT 4 LBT.

In one embodiment, the P time sub-pool(s) comprise(s) a slot duration in a Defer duration and part of slot durations in a Backoff Time in Cat 4 LBT.

In one embodiment, the P time sub-pool(s) comprise(s) a slot duration in a Defer duration and previous part of slot durations in a Backoff Time in Cat 4 LBT.

In one embodiment, the P time sub-pool(s) comprise(s) a slot duration in a Defer duration and part of slot durations in a Backoff Time in Type 1 UL channel access procedure.

In one embodiment, the P time sub-pool(s) comprise(s) a slot duration in a Defer duration and previous part of slot durations in a Backoff Time in Type 1 UL channel access procedure.

In one embodiment, the P time sub-pool(s) belong(s) to a slot duration in an initial CCA and an eCCA.

In one embodiment, the P time sub-pool(s) comprise(s) part of slot durations in an initial CCA and an eCCA.

In one embodiment, the P time sub-pool(s) comprise(s) previous part of slot durations in an initial CCA and an eCCA.

Embodiment 16

Figure 16:
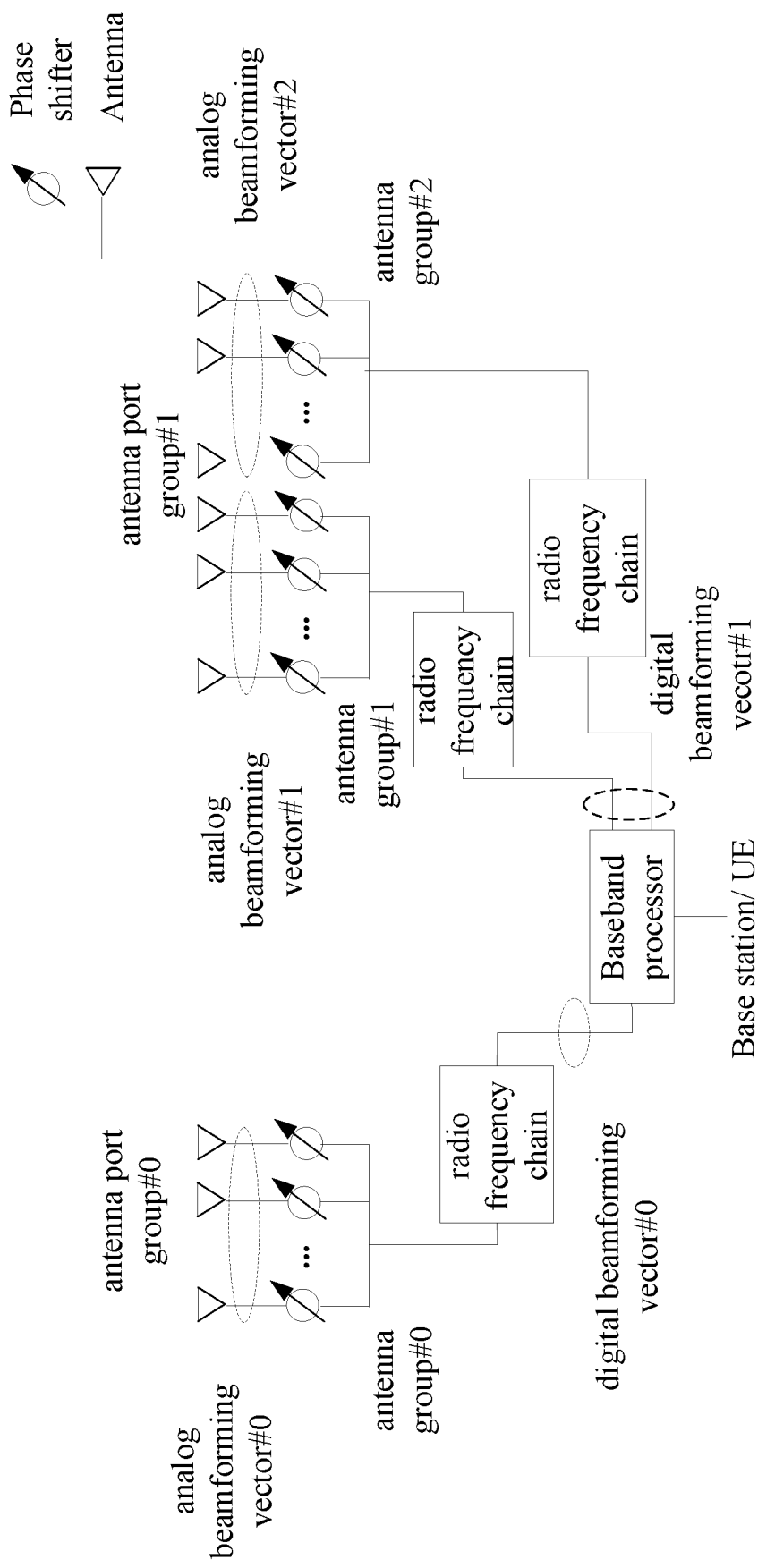
FIG. 16 illustrates a schematic diagram of antenna ports and antenna port sets according to another embodiment of the present disclosure.

Embodiment 16 illustrates a schematic diagram of an antenna port and an antenna port group, as shown in FIG. 16.

In Embodiment 16, an antenna port group comprises a positive integer number of antenna port(s); one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) are arranged diagonally to form an analog beamforming matrix corresponding to the given antenna port. Mapping coefficients from the positive integer number of antenna group(s) to the given antenna port constitute a digital beamforming vector corresponding to the given antenna port. A beamforming vector corresponding to the given antenna port is acquired as a product of the analog beamforming matrix and the digital beamforming vector corresponding to the given antenna port. Different antenna ports in an antenna port group are composed of a same antenna group, and different antenna ports in a same antenna port group correspond to different beamforming vectors.

FIG. 16 illustrates two antenna port groups, namely, antenna port group #0 and antenna port group #1. Herein, the antenna port group #0 consists of antenna group #0, and the antenna port group #1 consists of antenna group #1 and antenna group #2. Mapping coefficients from multiple antennas of the antenna group #0 to the antenna port group #0 constitute an analog beamforming vector #0; and mapping coefficients from the antenna group #0 to the antenna port group #0 constitute a digital beamforming vector #0; mapping coefficients from multiple antennas of the antenna group #1 and multiple antennas of the antenna group #2 to the antenna port group #1 respectively constitute an analog beamforming vector #1 and an analog beamforming vector #2; and mapping coefficients from the antenna group #1 and the antenna group #2 to the antenna port group #1 constitute a digital beamforming vector #1. A beamforming vector corresponding to any antenna port of the antenna port group #0 is acquired as a product of the analog beamforming vector #0 and the digital beamforming vector #0. A beamforming vector corresponding to any antenna port of the antenna port group #1 is acquired as a product of an analog beamforming matrix formed by the analog beamforming vector #1 and the analog beamforming vector #2 arranged diagonally and the digital beamforming vector #1.

In one embodiment, an antenna port group comprises an antenna port. For example, the antenna port group #0 in FIG. 16 comprises an antenna port.

In one subembodiment of the above embodiment, an analog beamforming matrix corresponding to the one antenna port is subjected to dimensionality reduction to form an analog beamforming vector, and a digital beamforming vector corresponding to the one antenna port is subjected to dimensionality reduction to form a scaler, a beamforming vector corresponding to the one antenna port is equal to an analog beamforming vector corresponding thereto. For example, the digital beamforming vector #0 in FIG. 16 is subjected to dimensionality reduction to form a scaler, and a beamforming vector corresponding to an antenna port of the antenna port group #0 is the analog beamforming vector #0.

In one embodiment, an antenna port group comprises a plurality of antenna ports. For example, the antenna port group #1 in FIG. 16 comprises a plurality of antenna ports.

In one subembodiment of the above embodiment, the plurality of antenna ports correspond to a same analog beamforming matrix.

In one subembodiment of the above embodiment, at least two of the plurality of antenna ports correspond to a same analog beamforming matrix.

In one subembodiment of the above embodiment, at least two of the plurality of antenna ports correspond to different analog beamforming matrices.

In one subembodiment of the above embodiment, the plurality of antenna ports correspond to different digital beamforming vectors.

In one subembodiment of the above embodiment, at least two of the plurality of antenna ports correspond to a same digital beamforming vector.

In one subembodiment of the above embodiment, at least two of the plurality of antenna ports correspond to different digital beamforming vectors.

In one embodiment, any two antenna ports in different antenna port groups correspond to different analog beamforming matrices.

In one embodiment, at least two antenna ports in different antenna port groups correspond to different analog beamforming matrices.

In one embodiment, at least two antenna ports in different antenna port groups correspond to a same analog beamforming matrix.

In one embodiment, two different antenna port groups are Quasi Co-Located (QCL).

In one embodiment, two different antenna port groups are not QCL.

In one embodiment, any two antenna ports of one antenna port group are QCL.

In one embodiment, any two antenna ports of one antenna port group are not QCL.

In one embodiment, at least two antenna ports of one antenna port group are QCL.

In one embodiment, at least two antenna ports of one antenna port group are not QCL.

In one embodiment, any two antenna ports of one antenna port group are spatial QCL.

In one embodiment, any two antenna ports of one antenna port group are not spatial QCL.

In one embodiment, at least two antenna ports of one antenna port group are spatial QCL.

In one embodiment, at least two antenna ports of one antenna port group are not spatial QCL.

Embodiment 17

Figure 17:
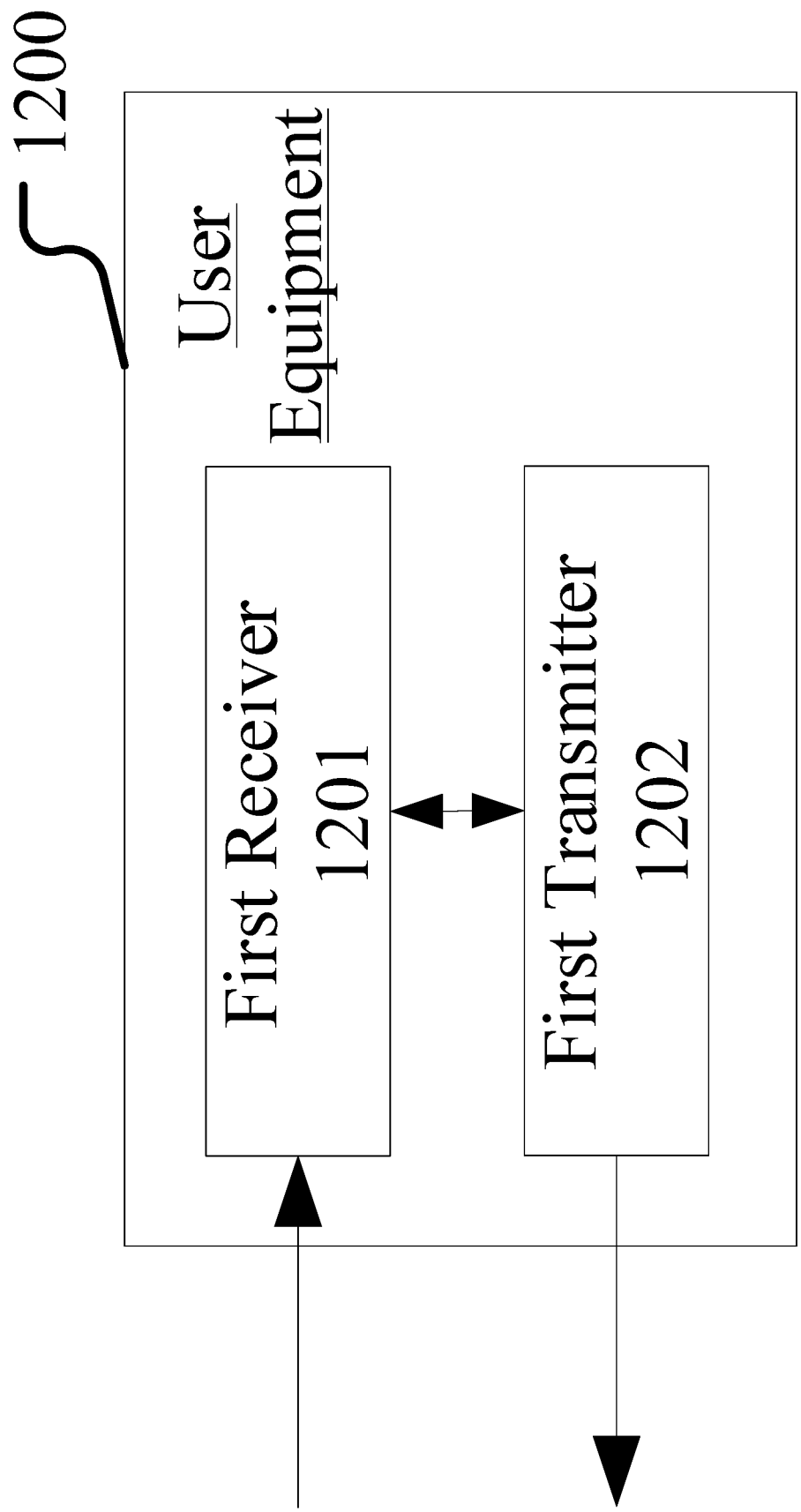
FIG. 17 illustrates a structure block diagram of a processing device in a UE according to one embodiment of the present disclosure.

Embodiment 17 illustrates a structure block diagram of a processing device in a UE, as shown in FIG. 17. In FIG. 17, a UE processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least first two of the receiver 456, the receiving processor 452 and the controller/processor 490 in Embodiment 4.

In one embodiment, the first transmitter 1202 comprises the transmitter 456, the transmitting processor 455 and the controller/processor 490 in Embodiment 4.

In one embodiment, the first transmitter 1202 comprises at least first two of the transmitter 456, the transmitting processor 455 and the controller/processor 490 in Embodiment 4.

A first receiver 1201 receives first information and second information, and performs a first access detection in a first time window;

A first transmitter 1202 transmits a first radio signal at a first time, or drops the transmission of a first radio signal at a first time.

In Embodiment 17, the first access detection is used for determining whether the first radio signal is transmitted at the first time; the first information indicates configuration information of the first radio signal and a first priority class, and the second information indicates a second priority class; the first radio signal is correlated with a first antenna port group, the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, the first access detection comprises: performing G energy detection(s) respectively in G time sub-pool(s) on a first sub-band to obtain G detection value(s), the G being a positive integer; wherein the first time window comprises the G time sub-pool(s), and whether the first antenna port group is spatially correlated with the second antenna port group is used for determining the G.

In one embodiment, the first receiver 1201 also performs P energy detection(s) respectively in P time sub-pool(s) on the first sub-band to obtain P detection value(s), P being a positive integer; wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

In one embodiment, the first antenna port group is spatially correlated with the second antenna port group, the first priority class is not greater than the second priority class, the second priority class is used for determining the G, and the G energy detection(s) is(are) correlated with the second antenna port group.

In one embodiment, the first antenna port group is spatially correlated with the second antenna port group, the first priority class is greater than the second priority class, the first priority class is used for determining the G, and the G energy detection(s) is(are) correlated with the first antenna port group.

In one embodiment, the first antenna port group is not spatially correlated with the second antenna port group, the first priority class is used for determining the G, and the G energy detection(s) is(are) correlated with the first antenna port group.

In one embodiment, the first transmitter 1202 also transmits a second radio signal at a second time, or drops the transmission a second radio signal at a second time; wherein the second information indicates configuration information of the second radio signal, the second radio signal is correlated with the second antenna port group, and whether the second radio signal is transmitted at the second time is related to whether the first antenna port group is spatially correlated with the second antenna port group.

Embodiment 18

Figure 18:
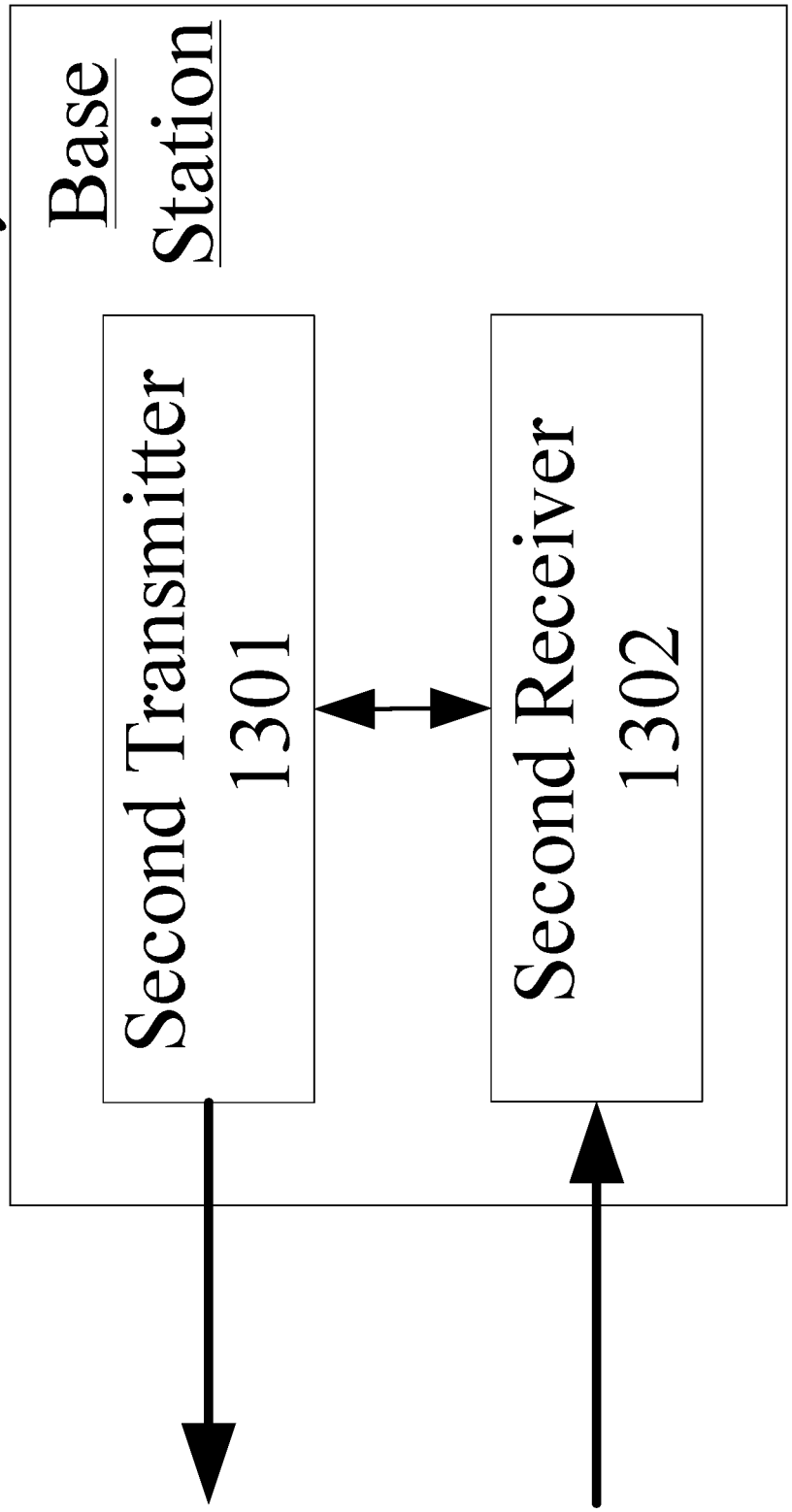
FIG. 18 illustrates a structure block diagram of a processing device in a base station according to one embodiment of the present disclosure.

Embodiment 18 illustrates a structure block diagram of a processing device in a base station, as shown in FIG. 18. In FIG. 18, a processing device 1300 in a base station comprises a second transmitter 1301 and a second receiver 1302.

In one subembodiment, the second transmitter 1301 comprises the transmitter 416, the transmitting processor 415 and the controller/processor 440 in Embodiment 4.

In one subembodiment, the second transmitter 1301 comprises at least the first two of the transmitter 416, the transmitting processor 415 and the controller/processor 440 in Embodiment 4.

In one subembodiment, the second receiver 1302 comprises the receiver 416, the receiving processor 412 and the controller/processor 440 in Embodiment 4.

In one subembodiment, the second receiver 1302 comprises at least the first two of the receiver 416, the receiving processor 412 and the controller/processor 440 in Embodiment 4.

A second transmitter 1301 transmits first information and second information;

A second receiver 1302 monitors a first radio signal at a first time.

In Embodiment 18, a first access detection performed in a first time window is used for determining whether the first radio signal is transmitted at the first time; the first information indicates configuration information of the first radio signal and a first priority class, and the second information indicates a second priority class; the first radio signal is correlated with a first antenna port group, the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first antenna port group comprises a positive integer number of antenna port(s), and the second antenna port group comprises a positive integer number of antenna port(s).

In one embodiment, the first access detection comprises: performing G energy detection(s) respectively in G time sub-pool(s) on a first sub-band to obtain G detection value(s), G being a positive integer; wherein the first time window comprises the G time sub-pool(s), and whether the first antenna port group is spatially correlated with the second antenna port group is used for determining the G.

In one embodiment, a receiver of the second information performs P energy detection(s) respectively in P time sub-pool(s) on the first sub-band to obtain P detection value(s), P being a positive integer; wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

In one embodiment, the first antenna port group is spatially correlated with the second antenna port group, the first priority is not greater than the second priority, the second priority is used for determining the G, and the G energy detection(s) is(are) correlated with the second antenna port group.

In one embodiment, the first antenna port group is spatially correlated with the second antenna port group, the first priority is greater than the second priority, the first priority is used for determining the G, and the G energy detection(s) is(are) correlated with the first antenna port group.

In one embodiment, the first antenna port group is not spatially correlated with the second antenna port group, the first priority is used for determining the G, and the G energy detection(s) is(are) correlated with the first antenna port group.

In one embodiment, the second receiver 1302 also monitors a second radio signal at a second time; wherein the second information indicates configuration information of the second radio signal, the second radio signal is correlated with the second antenna port group, and whether the second radio signal is transmitted at the second time is related to whether the first antenna port group is spatially correlated with the second antenna port group.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) used for wireless communications, comprising:
   receiving first information and second information;
   performing a first access detection in a first time window, wherein the first access detection comprises: performing G energy detection(s) respectively in G time sub-pool(s) on a first sub-band to obtain G detection value(s), G being a positive integer;
   transmitting a first radio signal at a first time, or dropping transmission of a first radio signal at a first time;
   wherein the first access detection is used for determining whether the first radio signal is transmitted at the first time, the first information indicates configuration information of the first radio signal and a first priority class, and the second information indicates a second priority class, the first radio signal being correlated with a first antenna port group; the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first time window comprises the G time sub-pool(s), and whether the first antenna port group is spatially correlated with the second antenna port group is used for determining the G; the first antenna port group comprises a positive integer number of antenna port(s), and the second antenna port group comprises a positive integer number of antenna port(s).

2. The method according to claim 1, comprising:
performing P energy detection(s) respectively in P time sub-pool(s) on the first sub-band to obtain P detection value(s), P being a positive integer;
wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, and the first priority class is greater than the second priority class; or the first antenna port group is not spatially correlated with the second antenna port group.

3. The method according to claim 1, wherein the first antenna port group is spatially correlated with the second antenna port group, the first priority class is not greater than the second priority class, the second priority class being used for determining the G, and the G energy detection(s) is(are) correlated with the second antenna port group;
or, the first antenna port group is spatially correlated with the second antenna port group, the first priority class is greater than the second priority class, the first priority class being used for determining the G, and the G energy detection(s) is(are) correlated with the first antenna port group;
or, the first antenna port group is not spatially correlated with the second antenna port group, the first priority class is used for determining the G, and the G energy detection(s) is(are) correlated with the first antenna port group.

4. The method according to claim 1, comprising:
transmitting a second radio signal at a second time, or dropping transmission of a second radio signal at a second time;
wherein the second information indicates configuration information of the second radio signal, the second radio signal being correlated with the second antenna port group, and whether the second radio signal is transmitted at the second time is related to whether the first antenna port group is spatially correlated with the second antenna port group.

5. A method in a base station for wireless communications, comprising:
transmitting first information and second information;
monitoring a first radio signal at a first time;
wherein a first access detection performed in a first time window is used for determining whether the first radio signal is transmitted at the first time; the first information indicates configuration information of the first radio signal and a first priority class, and the second information indicates a second priority class; the first radio signal is correlated with a first antenna port group, the first antenna port group being spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first access detection comprises: performing G energy detection(s) respectively in G time sub-pool(s) on a first sub-band to obtain G detection value(s), G being a positive integer; the first time window comprises the G time sub-pool(s), and whether the first antenna port group is spatially correlated with the second antenna port group is used for determining the G; the first antenna port group comprises a positive integer number of antenna port(s), and the second antenna port group comprises a positive integer number of antenna port(s).

6. The method according to claim 5, wherein a receiver of the second information performs P energy detection(s) respectively in P time sub-pool(s) on the first sub-band to obtain P detection value(s), P being a positive integer;
wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, and the first priority class is greater than the second priority class, or the first antenna port group is not spatially correlated with the second antenna port group.

7. The method according to claim 5, wherein the first antenna port group is spatially correlated with the second antenna port group, the first priority class is not greater than the second priority class, the second priority class being used for determining the G, and the G energy detection(s) is(are) correlated with the second antenna port group;
or, the first antenna port group is spatially correlated with the second antenna port group, the first priority class is greater than the second priority class, the first priority class being used for determining the G, and the G energy detection(s) is(are) correlated with the first antenna port group;
or, the first antenna port group is not spatially correlated with the second antenna port group, the first priority class is used for determining the G, and the G energy detection(s) is(are) correlated with the first antenna port group.

8. The method according to claim 5, comprising:
monitoring a second radio signal at a second time;
wherein the second information indicates configuration information of the second radio signal, the second radio signal being correlated with the second antenna port group, and whether the second radio signal is transmitted at the second time is related to whether the first antenna port group is spatially correlated with the second antenna port group.

9. A User Equipment (UE) for wireless communications, comprising:
a first receiver, receiving first information and second information, and performing a first access detection in a first time window, wherein the first access detection comprises: performing G energy detection(s) respectively in G time sub-pool(s) on a first sub-band to obtain G detection value(s), G being a positive integer;
a first transmitter, transmitting a first radio signal at a first time, or dropping transmission of a first radio signal at a first time;
wherein the first access detection is used for determining whether the first radio signal is transmitted at the first time; the first information indicates configuration information of the first radio signal and a first priority class, and the second information indicates a second priority class; the first radio signal is correlated with a first antenna port group, the first antenna port group is spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first time window comprises the G time sub-pool(s), and whether the first antenna port group is spatially correlated with the second antenna port group is used for determining the G; the first antenna port group comprises a positive integer number of antenna port(s), and the second antenna port group comprises a positive integer number of antenna port(s).

10. The UE according to claim 9, wherein the first receiver also performs P energy detection(s) respectively in P time sub-pool(s) on the first sub-band to obtain P detection value(s), P being a positive integer; wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, and the first priority class is greater than the second priority class; or the first antenna port group is not spatially correlated with the second antenna port group.

11. The UE according to claim 9, wherein the first antenna port group is spatially correlated with the second antenna port group, the first priority class is not greater than the second priority class, the second priority class being used for determining the G, and the G energy detection(s) is(are) correlated with the second antenna port group;
or, the first antenna port group is spatially correlated with the second antenna port group, the first priority class is greater than the second priority class, the first priority class being used for determining the G, and the G energy detection(s) is(are) correlated with the first antenna port group;
or, the first antenna port group is not spatially correlated with the second antenna port group, the first priority class is used for determining the G, and the G energy detection(s) is(are) correlated with the first antenna port group.

12. The UE according to claim 9, wherein the first transmitter also transmits a second radio signal at a second time, or drops transmission of a second radio signal at a second time; wherein the second information indicates configuration information of the second radio signal, the second radio signal being correlated with the second antenna port group, and whether the second radio signal is transmitted at the second time is related to whether the first antenna port group is spatially correlated with the second antenna port group.

13. A base station for wireless communications, comprising:
a second transmitter, transmitting first information and second information;
a second receiver, monitoring a first radio signal at a first time;
wherein a first access detection performed in a first time window is used for determining whether the first radio signal is transmitted at the first time; the first information indicates configuration information of the first radio signal and a first priority class, and the second information indicates a second priority class; the first radio signal is correlated with a first antenna port group, the first antenna port group being spatially correlated with a second antenna port group, and a relationship between the first priority class and the second priority class is used for determining duration of the first time window; or, the first antenna port group is not spatially correlated with the second antenna port group, and only the first priority class between the first priority class and the second priority class is used for determining duration of the first time window; the first access detection comprises: performing G energy detection(s) respectively in G time sub-pool(s) on a first sub-band to obtain G detection value(s), G being a positive integer; the first time window comprises the G time sub-pool(s), and whether the first antenna port group is spatially correlated with the second antenna port group is used for determining the G; the first antenna port group comprises a positive integer number of antenna port(s), and the second antenna port group comprises a positive integer number of antenna port(s).

14. The base station according to claim 13, wherein a receiver of the second information performs P energy detection(s) respectively in P time sub-pool(s) on the first sub-band to obtain P detection value(s), P being a positive integer; wherein the second priority class is used for determining the P, the P energy detection(s) is(are) correlated with the second antenna port group, and a start time of the P time sub-pool(s) is earlier than a start time of the first time window; the first antenna port group is spatially correlated with the second antenna port group, the first priority class is greater than the second priority class, or the first antenna port group is not spatially correlated with the second antenna port group.

15. The base station according to claim 13, wherein the first antenna port group is spatially correlated with the second antenna port group, the first priority class is not greater than the second priority class, the second priority class being used for determining the G, and the G energy detection(s) is(are) correlated with the second antenna port group;
or, the first antenna port group is spatially correlated with the second antenna port group, the first priority class is greater than the second priority class, the first priority class being used for determining the G, and the G energy detection(s) is(are) correlated with the first antenna port group;
or, the first antenna port group is not spatially correlated with the second antenna port group, the first priority class is used for determining the G, and the G energy detection(s) is(are) correlated with the first antenna port group.

16. The base station according to claim 13, wherein the second receiver also monitors a second radio signal at a second time; wherein the second information indicates configuration information of the second radio signal, the second radio signal being correlated with the second antenna port group, and whether the second radio signal is transmitted at the second time is related to whether the first antenna port group is spatially correlated with the second antenna port group.

* * * * *